United States Patent
Furesjö et al.

(10) Patent No.: US 10,038,886 B2
(45) Date of Patent: Jul. 31, 2018

(54) INERTIA AUDIO SCROLLING

(71) Applicant: Microsoft Technology Licensing, LLC, Redmond, WA (US)

(72) Inventors: Fredrik Furesjö, Solna (SE); Mattias Dan Nilsson, Sundbyberg (SE); Daniel Nitsche, Stockholm (SE); Henrik Valdemar Turbell, Stockholm (SE); Jonas Nils Rune Lindblom, Solna (SE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/944,858

(22) Filed: Nov. 18, 2015

(65) Prior Publication Data

US 2017/0085854 A1 Mar. 23, 2017

(30) Foreign Application Priority Data

Sep. 18, 2015 (GB) .................... 1516553.3

(51) Int. Cl.
*H04N 9/80* (2006.01)
*H04N 9/87* (2006.01)
(Continued)

(52) U.S. Cl.
CPC ......... *H04N 9/8715* (2013.01); *G06F 3/0485* (2013.01); *G10L 15/265* (2013.01);
(Continued)

(58) Field of Classification Search
CPC .... H04N 9/8715; H04N 7/152; G06F 3/0485; G10L 15/265; G10L 21/055; G11B 27/34; H04M 3/42221
(Continued)

(56) References Cited

U.S. PATENT DOCUMENTS 5,564,005 A * 10/1996 Weber ................. G06F 3/04883
715/863
5,793,948 A * 8/1998 Asahi .................... G06F 11/323
714/45
(Continued)

FOREIGN PATENT DOCUMENTS

CN 102436812 5/2012
KR 20140008061 1/2014

OTHER PUBLICATIONS

"AudioNote—Notepad and Voice Recorder", Available at: https://itunes.apple.com/us/app/audionote-notepad-voice-recorder/id406393290?mt=12, Jan. 23, 2014, 3 pages.
(Continued)

*Primary Examiner* — Helen Shibru

(57) ABSTRACT

Embodiments discussed herein include: accessing by a user terminal a recording of a communication session in the form of a media file wherein the media file comprises at least an audio component; accessing by the user terminal, metadata associated with the media file, wherein the metadata comprises an indication of a respective one or more visual representations of each of a plurality of events determined to have occurred during the communication session, wherein at least some of the visual representations comprise text converted from at least one communication stream of the recorded communication session, and wherein the metadata further comprises timing information linking the respective visual representations to the events; playing the media file using a media playing application running on the user terminal; and controlling play back of the media file so that a play back rate of the audio component is synchronized with a rate of a user scrolling through the visual representations.

20 Claims, 12 Drawing Sheets

(51) Int. Cl.
| | |
|---|---|
| *G10L 15/26* | (2006.01) |
| *G10L 21/055* | (2013.01) |
| *G11B 27/34* | (2006.01) |
| *H04N 7/15* | (2006.01) |
| *G06F 3/0485* | (2013.01) |
| *H04M 3/42* | (2006.01) |

(52) U.S. Cl.
CPC .......... *G10L 21/055* (2013.01); *G11B 27/34* (2013.01); *H04M 3/42221* (2013.01); *H04N 7/152* (2013.01); *H04M 2203/301* (2013.01); *H04M 2203/305* (2013.01)

(58) Field of Classification Search
USPC ....... 386/231, 201, 230, 203, 205–206, 222, 386/278, 241
See application file for complete search history.

(56) References Cited

U.S. PATENT DOCUMENTS

| | | | |
|---|---|---|---|
| 6,172,712 B1 * | 1/2001 | Beard | H04N 5/4401 348/143 |
| 6,446,041 B1 | 9/2002 | Reynar et al. | |
| 6,703,550 B2 | 3/2004 | Chu | |
| 7,383,495 B2 | 6/2008 | Dontcheva et al. | |
| 8,230,334 B2 | 7/2012 | Park | |
| 8,433,431 B1 | 4/2013 | Master et al. | |
| 8,634,694 B2 * | 1/2014 | Yachi | G09B 5/065 386/201 |
| 8,948,892 B2 | 2/2015 | Story et al. | |
| 2002/0191071 A1 | 12/2002 | Rui et al. | |
| 2003/0143944 A1 * | 7/2003 | Martin | G09F 27/00 455/3.01 |
| 2004/0175036 A1 | 9/2004 | Graham | |
| 2004/0263636 A1 | 12/2004 | Cutler et al. | |
| 2007/0168413 A1 * | 7/2007 | Barletta | G06F 3/04883 709/203 |
| 2008/0005656 A1 * | 1/2008 | Pang | G09B 5/062 715/203 |
| 2008/0180391 A1 * | 7/2008 | Auciello | G06F 3/1423 345/156 |
| 2008/0263010 A1 | 10/2008 | Roychoudhuri et al. | |
| 2009/0113278 A1 | 4/2009 | Denoue et al. | |
| 2010/0125791 A1 | 5/2010 | Katis et al. | |
| 2011/0123972 A1 | 5/2011 | Friedman | |
| 2011/0153330 A1 | 6/2011 | Yazdani et al. | |
| 2011/0246463 A1 | 10/2011 | Carson et al. | |
| 2011/0258547 A1 * | 10/2011 | Symons | G06F 3/04817 715/723 |
| 2011/0316884 A1 | 12/2011 | Giambalvo et al. | |
| 2012/0278082 A1 * | 11/2012 | Borodin | G06F 17/30873 704/260 |
| 2012/0310642 A1 | 12/2012 | Cao et al. | |
| 2013/0067420 A1 | 3/2013 | Pittappilly | |
| 2013/0106888 A1 | 5/2013 | Penner et al. | |
| 2013/0325972 A1 | 12/2013 | Boston et al. | |
| 2014/0108288 A1 | 4/2014 | Calman et al. | |
| 2014/0253521 A1 * | 9/2014 | Hicks | G06F 3/03545 345/179 |
| 2015/0127340 A1 | 5/2015 | Epshteyn et al. | |
| 2015/0142800 A1 | 5/2015 | Thapliyal | |
| 2017/0083214 A1 | 3/2017 | Furesjö et al. | |

OTHER PUBLICATIONS

"Cogi", Retrieved on: Jul. 7, 2015, Available at: https://legacy.cogi.com/create-accurate-meeting-minutes, 5 pages.
"Evernote", Retrieved on: Jul. 7, 2015, Available at: https://evernote.com/contact/support/kb/#!/article/28606837, 2 pages.
"Record and Play Back Meetings in Lync 2010", Available at: https://support.office.com/en-sg/article/Record-and-play-back-meetings-in-Lync-2010-0977bc93-80d3-441e-836d-21dbab803ba3—Retrieved on: Jul. 7, 2015, 3 pages.
"Video-with-Slides publishing made Easy", Available at: http://www.viidea.com/, Jun. 5, 2014, 4 pages.
"VRS Recording System", Available at: http://www.nch.com.au/vrs/, Dec. 30, 2014, 2 pages.
Lee, "DiMaβ: A Technique for Audio Scrubbing and Skimming using Direct Manipulation", In Proceedings of the 1st ACM Workshop on Audio and Music Computing for Multimedia, Oct. 27, 2006, 8 pages.
Lee, "Scrolling Through Time: Improving Interfaces for Searching and Navigating Continuous Audio Timelines", In Technical Report of Department of Computer Science, Dec. 2006, 40 pages.
Uehori, "Portable Presentation Player: Mobile Viewing of User-Controllable Movies of Slide Presentations", In Proceedings of 7th International Conference on Pervasive Computing, May 11, 2009, 4 pages.
van Doorn "Accelerated Playback of Meeting Recordings", In Thesis Submitted in Partial Fulfillment of the Requirements for the Degree of Master of Science, Jul. 2007, 68 pages.
"International Search Report and Written Opinion", Application No. PCT/US2016/050847, dated Nov. 21, 2016, 11 pages.
"International Search Report and Written Opinion", Application No. PCT/US2016/050848, dated Nov. 4, 2016, 14 pages.
Leuski,"iNeATS: Interactive Multi-Document Summarization", Proceedings of the 41st Annual Meeting on Association for Computational Linguistics, Jan. 1, 2003, 4 pages.
Moens,"Summarizing Texts at Various Levels of Detail", Apr. 28, 2004, 13 pages.
"Second Written Opinion", Application No. PCT/US2016/050848, dated Aug. 10, 2017, 8 pages.
"International Preliminary Report on Patentability", Application No. PCT/US2016/050848, dated Nov. 30, 2017, 9 pages.
"International Preliminary Report on Patentability", Application No. PCT/US2016/050847, Mar. 29, 2018, 8 pages.

* cited by examiner

INERTIA AUDIO SCROLLING

RELATED APPLICATION

This application claims priority under 35 USC 119 or 365 to Great Britain patent application number 1516553.3, titled "Inertia Audio Scrolling" and filed on Sep. 18, 2015, the entire disclosure of which is incorporated by reference herein.

BACKGROUND

Packet-based communication networks such as the Internet have developed to allow highly efficient transmission of large quantities of communication traffic between users of different user terminals as a part of a communication system. Communication data can be exchanged over the packet-based network via a server that is suitable for routing communication data between the user terminals of two or more users.

To participate in a communication session each user runs a communication client application on his or her respective terminal. When the user runs the communication client, the client allows the user to make or accept contact requests to or from other users of the communication system and thereby become pre-agreed contacts, and to then establish a communication connection with one or more of those contacts so as to send and receive communications over the network. There may be other ways that the user can make or accept contact requests to or from other users of the communication system e.g. by way of an email invitation. In a communication session between connected users, the users may use their respective user terminals to transmit a stream of encoded communication data over the network to be received by the one or more other user terminals connected in the communication session. Transmitted data streams may be processed at the server and forwarded to each of the other user terminals participating in the communication session.

The communication data can include user-captured audio and/or video data and text based messages (Instant messaging, IM) as part of a one-to-one call between two user terminals or a conference call between three or more user terminals. The communication clients can also be used to communicate other data, for example allowing users to share files such as contact details, documents and/or media files. The communication client may also have the ability to interact with other applications so that data associate with those applications can be shared. For instance, a first user terminal can be used to present a slideshow presentation that can be shared live as part of a communication session.

The communication data is typically exchanged in real-time so that communications sessions are conducted live, although some communication systems may also provide a cloud storage system which can store messages and record entire communication sessions so that they can be subsequently downloaded by user terminals. A communication session involving audio-visual data may be recorded and stored at the cloud storage medium in the form of a video file. The recorded communication session video file may be downloaded and played back by one of the user terminals that was invited to be part of the recorded communication session. This may be useful in the event that one or more contacts invited to be part of a particular communication session is offline or otherwise unable to join that communication session. Another reason is that a user may simply want to re-watch or listen back to the communication session that he was part of. The downloaded video recording can be played back through a media playing application and controlled according to the watching user's preferences.

SUMMARY

Typically when a user wants to navigate through a playback of a recorded a communication session, he typically has to use an on screen control to "drag" or slide a visual marker along a timeline. The timeline usually represents the duration of the recording. For example the user manually drags the visual marker along the timeline or otherwise clicks at points along the timeline in order to skip to that moment in time in the recording. While this way of controlling the playback may be familiar to users of media playing applications, it is not a very efficient or useful way of navigating a recorded communication session.

Therefore it would be desirable to have a more convenient way of enabling a user to be able to quickly find interesting or relevant parts of a recorded communication session that is for playback at the user's user terminal. According to various implementations, the playback of a recorded communication session can be navigated by way of a user input scrolling control wherein part of the user interface of the media playing application is scrolled in a continuous, flowing motion.

According to a first aspect of the present disclosure, there is provided a method for controlling playback of a recorded communication session, the method comprising: accessing by a user terminal a recording of a communication session in the form of a media file wherein the media file comprises at least an audio component; accessing by the user terminal, metadata associated with the media file, wherein the metadata comprises an indication of a respective one or more visual representations of each of a plurality of events determined to have occurred during the communication session, wherein at least some of the visual representations comprise text converted from at least one communication stream of the recorded communication session, and wherein the metadata further comprises timing information linking the respective visual representations to the events; playing the media file using a media playing application running on the user terminal; and controlling play back of the media file so that a play back rate of the audio component is synchronised with a rate of a user scrolling through the visual representations.

According to a second aspect of the present disclosure, there is provided a user terminal for controlling playback of a recorded communication session, the user terminal comprising: a processor and at least one storage element, together configured to: access and store a recording of a communication session in the form of a media file wherein the media file comprises at least an audio component; metadata associated with the media file, wherein the metadata comprises an indication of a respective one or more visual representations of each of a plurality of events determined to have occurred during the communication session, wherein at least some of the visual representations comprise text converted from at least one communication stream of the recorded communication session, and wherein the metadata further comprises timing information linking the respective visual representations to the events; a media playing application configured to play back the media file; a visual display unit configured to display a user interface of the media playing application; wherein the media playing application is configured to control play back of the media file so that a play back rate of the audio component is synchronised with a rate of a user scrolling through the visual representations.

According to a third aspect of the present disclosure, there is provided a media playing application embodied on a non-transitory computer-readable medium and comprising code configured so as when run on a user terminal to perform the above described method of the first aspect of the present disclosure.

This summary is provided to introduce a selection of concepts in a simplified form that are further described below in the Detailed Description. This summary is not intended to identify key features of essential features of the claimed subject matter, nor is it intended to be used to limit the scope of the claimed subject matter.

BRIEF DESCRIPTION OF THE DRAWINGS

For a better understanding of the embodiments discussed herein and to show how it may be put into effect, reference is made by way of example to the accompanying drawings in which.

DETAILED DESCRIPTION

Figure 1:
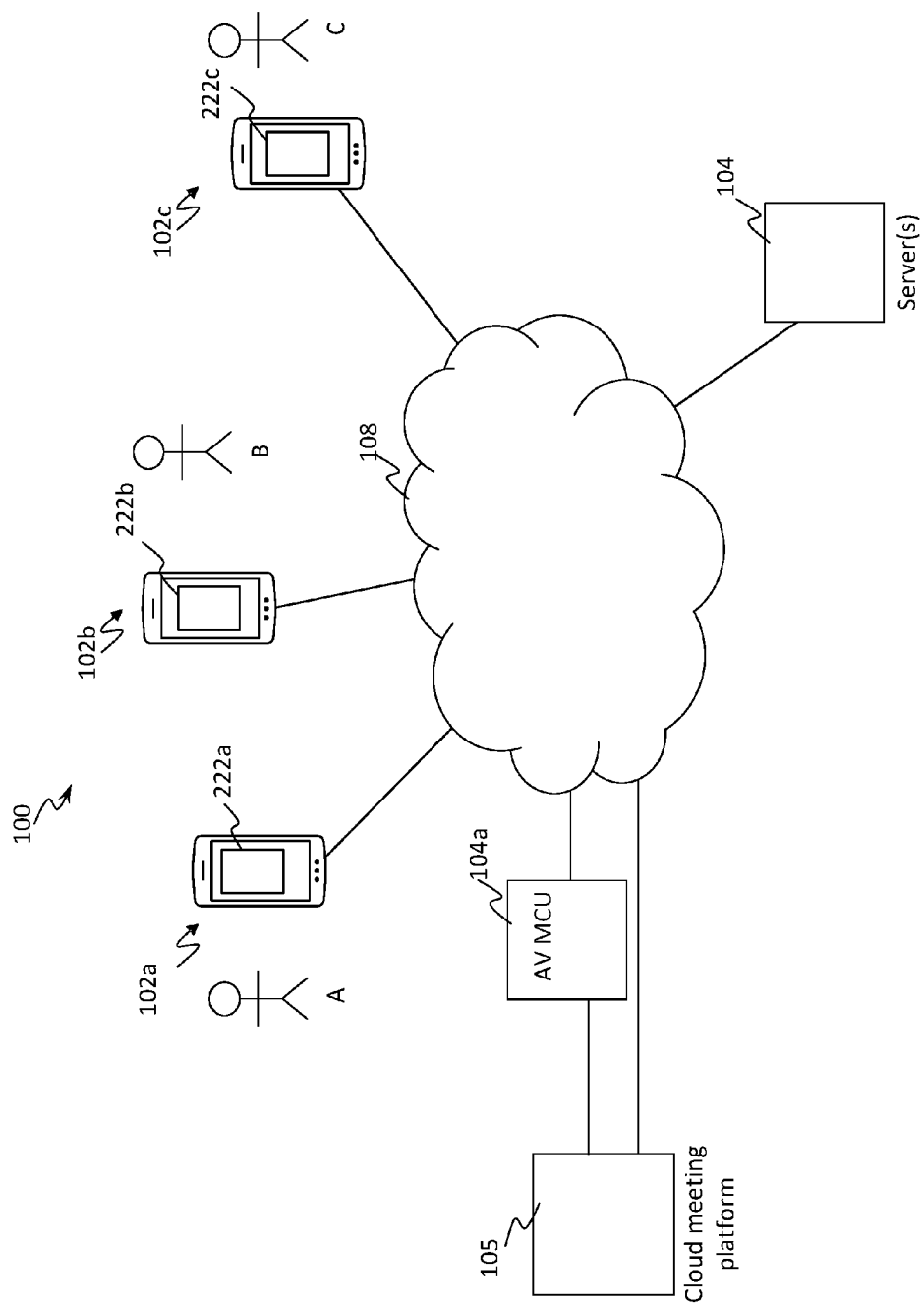
FIG. 1 is a schematic representation of a communication network.
Figure 2:
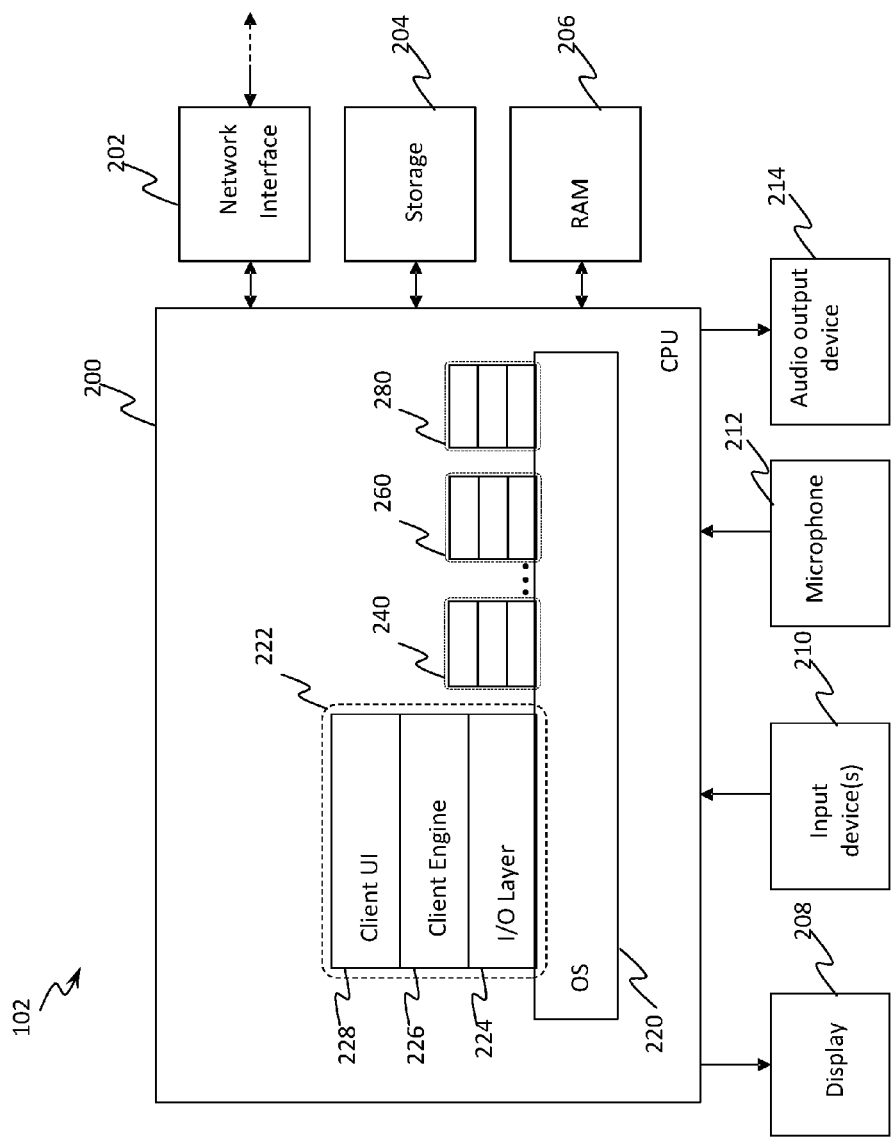
FIG. 2 is a schematic block diagram of a user terminal.

FIGS. 1 and 2 schematically illustrate a communication system 100, in this case a communication system implemented over a packet-switched network such as the Internet. A plurality of end-user terminals 102 and servers 104 are each connected to the Internet, represented schematically as a communication "cloud" 108 comprising a plurality of inter-networked routing nodes for routing packets of data between the user terminals 102 and/or servers 104. One or more of these servers may be an audio-visual multipoint control unit (AV MCU) 104a suitable for receiving, processing and directing the communication data streams as between the user terminals 102. The AV MCU 104a is also configured to connect to a cloud meeting platform 105. The cloud meeting platform may be remotely connected to the AV MCU 104a over the network 108. Alternatively the AV MCU and cloud meeting platform 105 may be implemented as a single unit. The cloud meeting platform 105 also receives the communication data streams via the AV MCU 104a. The cloud meeting platform 105 is configured to further process the received communication data streams and store a recording of the communication session for subsequent access by one or more user terminals of the communication system 100. Details of the cloud meeting platform 105 as used in the context of the present disclosure are described below.

Each of the connections between a user terminal 102 and the network 108 may comprise a link via a wired or wireless modem, and may or may not be made via another network such as a local area network or packet-based service of a cellular network operator, etc. Although network 108 is referred to as being a packet-switched network, it may instead be implemented as a circuit-switched network. Details of the various possible arrangements for accessing the Internet will be familiar to a person skilled in the art. Each of the user terminals are shown associated with a user A, B, C. It will be appreciated there may be more or fewer user terminals than those shown by FIG. 1. The user terminals 102 may be any one of (but not limited to): Personal Computers (PC), laptops, mobile telephones (smartphones), gaming consoles, Personal Digital Assistants (PDA), tablet computers, wearable technology devices e.g. smartwatches, smart jewelry or virtual reality headsets, etc. For the purpose of the rest of this disclosure the user terminal 102 is shown as a smartphone.

In order to implement the communication system for transmitting and receiving communication data between contacts, each of a plurality of user terminals 102 is installed with a respective instance of a communication client application 222, as shown in FIG. 2. The communication client 222 is configured to transmit and receive a number of types of communication data including but not limited to: captured audio data (e.g. Voice over Internet Protocol VoIP data) captured video data, instant messaging (IM) text data, and/or file transfers. The communication client may further be configured to transmit and receive audio-visual data as part of a presentation performed at one or more of the user terminals.

The communication client may be configured to enable remote screen between two or more user terminals 102. Further still the communication client application may be configured to interact with a number of other applications running on the user terminal 102. In this way a first user may share their perspective of using one or more of these other applications at their user terminal 102 and share it with the other user terminals 102 in the communication session. For example a first user terminal (e.g. 102a associated with user A) may run a slideshow presentation application in order to share a pre-prepared presentation with one or more other users in a communication session. The communication client 222a may be able to access or otherwise interact with the slideshow application in order to generate communication data that represents the presentation and that can be transmitted to the other user terminals 102 in the communication session 102. For example all audio-visual elements of the presentation can be encoded as audio and video data and transmitted to the other user terminals 102 as part of the communication session. Thus the presentation is shared between the first user who may be giving the presentation and the one or more other users in the communication session who receive the presentation. While the first user is sharing his presentation, the users may still transmit other communication data. So for example the first user (presenter) can provide an audio visual commentary to his presentation and a discussion can be held between all of the users in the communication session. The presenter, and/or one or more of the other users with permission from the presenter, may be able to interact with the presentation itself by adding visual or audible annotations at one or more points in the presentation.

In embodiments a presentation could be remotely hosted from two or more user terminals 102 running respective instances of the application handling the presentation. Although a slideshow presentation is used in the above example, a presentation may take various different forms, including sharing of a document and the sharing of or audio and/or visual media e.g. playing a video or audio file.

As shown in FIG. 2, the user terminal 102 comprises a processing apparatus 200 in the form of one or more central processing units (CPUs). The processing apparatus 200 is operatively coupled to a plurality of devices: a network interface 202 for connecting to the network 108, a non-volatile storage medium 204 such as an internal or external hard drive and/or flash memory, a volatile storage medium in the form of a RAM 206, a display 208 such as an LED or LCD screen, one or more user input devices 210 such as touch screen system, keyboard, mouse or trackpad etc. capable of receiving user input controls, one or microphones 212, one or more audio speakers 214. The terminal 102 is installed with the instance of the communication client application 222, in that the client 222 is stored in the non-volatile storage medium 204 and arranged to be run on the processing apparatus 200 (typically under control of an operating system 220 also running on the processing apparatus 200). The client application 222 comprises an I/O layer 224, a client engine layer 226 and a client user interface (UI) layer 228.

In operation, the I/O layer 224 handles the lower-level codecs for encoding and decoding text, voice and/or video communications for the purpose of transmission and reception over the network 108. The client engine 226 is then responsible for managing a list of contacts and for establishing communication channels with the AV MCU server 104a. The UI layer 228 is responsible for outputting an on-screen user interface to the user via the display 208, including on-screen controls for managing communications.

The terminal 102 may be installed with one or more instances of other applications, each represented in FIG. 2 as a software stack 240 running on the processing apparatus 200 under the control of an operating system 220. These other applications 240 may take many different forms and may include a slideshow presentation application, document editing applications, media playing applications and so on. As described above the communication client 222 may be configured to interact with these other applications 240 so that the communication data can include a screen share presentation involving the other applications 240 e.g. a first user can use slideshow application to screen share a slideshow to the other user terminals 102 in the communication session.

Alternatively or in addition to a user terminal 102 being installed with one of the other applications 240, the user terminal may be configured to access a web version of an application online. For example the user terminal 102 may be installed with an internet client application 260 (web browser) suitable for accessing a remote online application over the network 108. The cloud meeting platform 105 may be configured to host and run one or more such online applications 340. The communication client 222 is able to interact with the internet client application 260 so that the communication data can include data relating to the online application e.g. a screen share presentation can be shared in a communication session based on using an online slideshow application.

Figure 3:
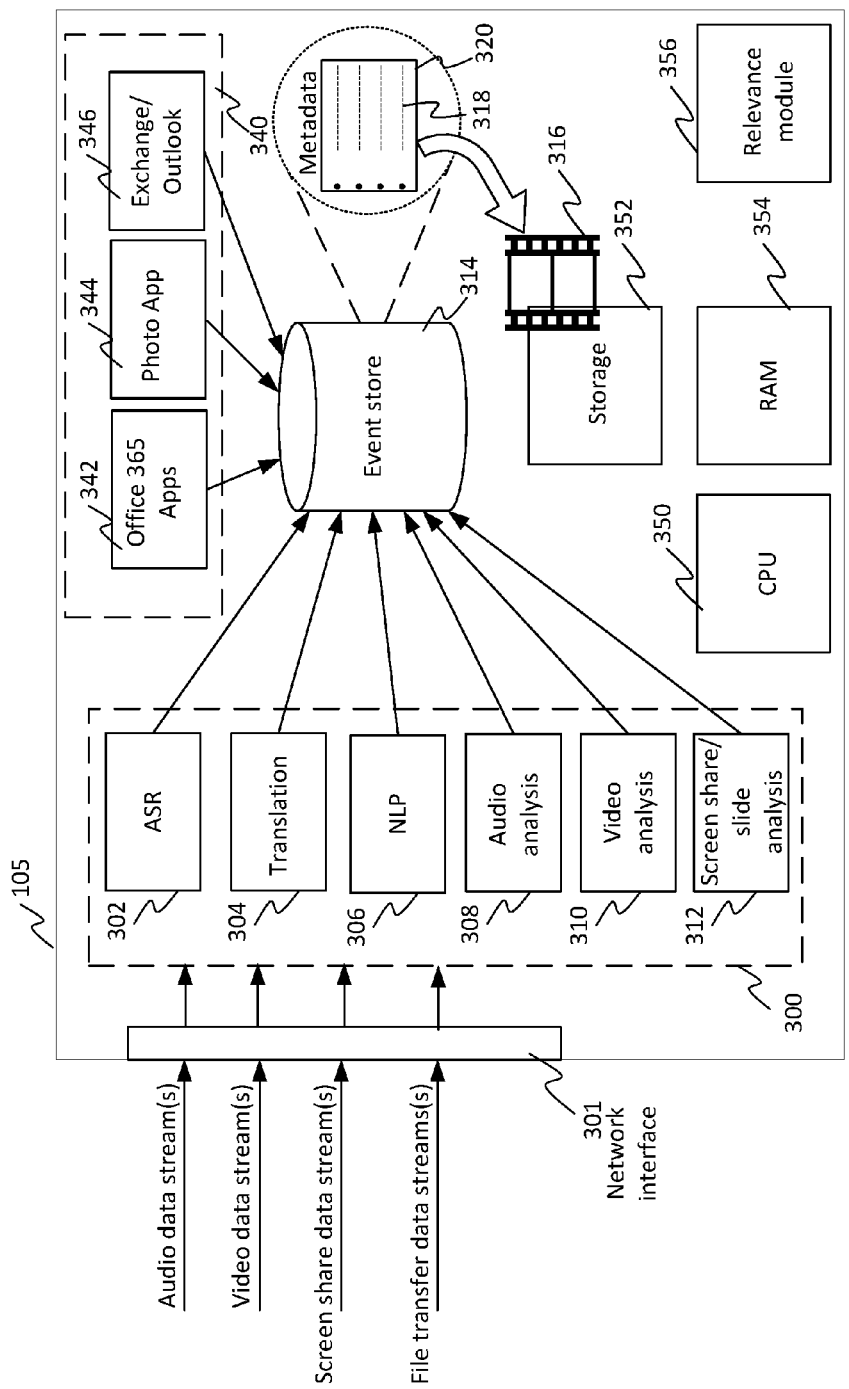
FIG. 3 is a schematic block diagram of a cloud meeting platform.

Referring to FIG. 3, a more detailed representation of the cloud meeting platform 105 is shown. The cloud meeting platform 105 optionally includes a network interface 301 configured for receiving the communication data streams forwarded by the AV MCU 104a over the network 108. The cloud meeting platform 105 further comprises one or more central processing units 350 and at least one non-volatile storage medium 352 such as an internal or external hard drive and/or flash memory, a volatile storage medium in the form of a RAM 354. Stored on the non-volatile storage medium 352 are a series of communication analysis software modules 300 including an Automatic Speech Recognition engine 302, a speech translation engine 304, a Natural Language Processing engine (NLP) 306, an audio analysis engine 308, a video analysis engine 310 and a screen share/slide analysis engine 312. Each of these are described in more detail later in the disclosure. The CPU(s) are configured to run the analysis software modules 300 in conjunction with the RAM 354.

The cloud meeting platform 105 further comprises an event store 314 for storing metadata event files that represent the occurrence of events detected during an analysis of the recorded communication data streams by the communication analysis software modules 300, the process of which is described in more detail below. As mentioned above, the cloud meeting platform 105 may further host and run one or more online applications. Events can also be detected (and a visual representation of them stored) when one of the other applications 240 or online applications 340 running on the cloud meeting platform 105 are used for example to edit, interact with and/or share data as part of a communication session.

Figure 4:
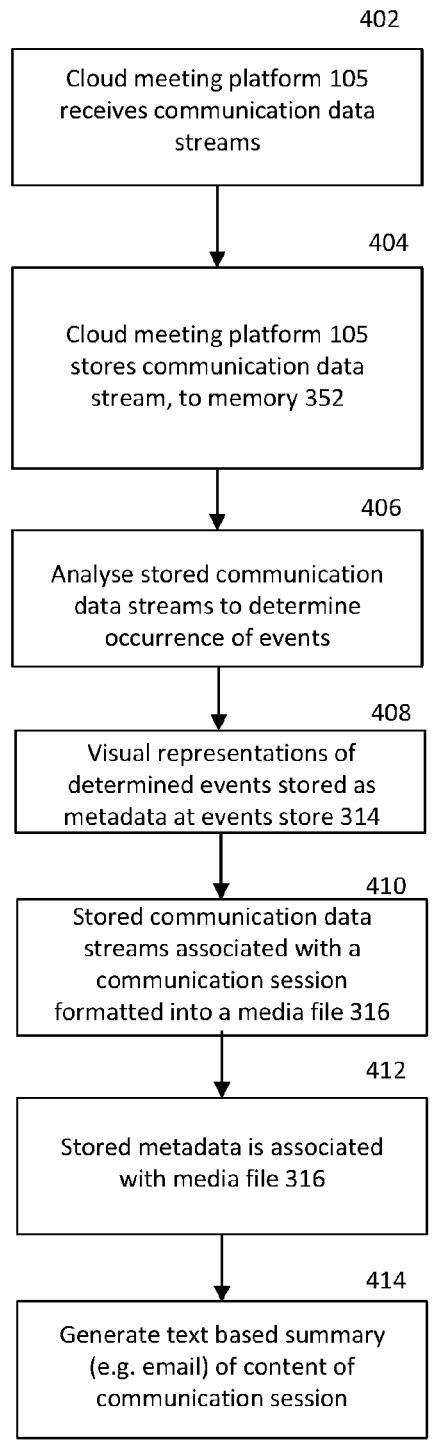
FIG. 4 is a flowchart for recording and analysing a communication session

Referring to FIG. 4, a flowchart shows the steps performed at the cloud meeting platform 105 for recording communication sessions and making the recordings available for playback. At step 402 cloud meeting platform 105 receives communication data streams of one or more communication sessions from the AV MCU 104a. The cloud meeting event platform 105 is configured to resolve received data streams associated with different communication sessions. The received communication data for each communication session includes one or more of audio data streams, video data streams, screen share streams (e.g. a slideshow presentation), and data file transfers.

At step 404 the received communication data streams of each communication session are stored at the non-volatile storage medium 352 such that each communication session is recorded. At step 406 after the communication data streams have been stored they are analysed to determine events that occurred during each communication session. This involves the cloud meeting platform 105 applying one or more of the communication analysis software modules 300 to each of the stored communication streams as appropriate. For example the video analysis engine 310 will only be applied to video streams while the screen share/slide analysis engine 312 is only applied to screen sharing streams. The analyses are performed in order to determine events that have occurred during a communication session. The steps 402 to 406 may be performed in real-time, i.e. during a communication session as it is happening. In this scenario, the cloud meeting platform 105 interacts with the AV MCU 104a to record the communication data streams and analyse them in real time.

Alternatively, rather than recording the independent communication streams in real-time, a recording of a completed communication session may be accessed and analysed at the cloud meeting platform 105. For example, the recording of the communication session may be a video or audio file. The video or audio file may be generated by the AV MCU 104a or another server associated with the communication system (not shown in FIG. 3), from which the file is uploaded to the cloud meeting platform 105. The recorded video or audio file could alternatively be generated and uploaded by one of the user terminals 102 in the communication session. The cloud meeting platform 105 can analyse the received video or audio file by applying the one or more communication analysis software modules 300 to it. In this way, the analysis is performed on the recorded video or audio file rather than on stored communication streams received from the AV MCU 104*a*.

The following provides some examples of the analyses that are performed as part of step 406. The stored audio data streams may be input to the Automatic Speech Recognition engine (ASR) 302. A suitable ASR 302 is the Microsoft Bing® ASR service. The ASR 302 works by running a series of algorithms that will be known to those skilled in the art of speech recognition techniques. The ASR 302 may be configured to recognise audio speech data in more than one language. The ASR 302 converts the stored audio speech data and outputs text data in the recognised language as a full text transcript of the communication session. The full text transcript may in itself be considered as a visual representation of an event of the communication session. The converted output text may be input to the NLP engine 306 so that keywords (and/or keyphrases) can be extracted from the converted output text. However, if the NLP 306 is only able to recognise and extract keywords in a particular language, the converted output text can first be input to an automatic speech translation engine 304. An example of a suitable speech translation engine 304 is the Microsoft Bing® translation service. The speech translation engine 304 uses known language processing algorithms to convert the input text from a first language into a second language which is compatible with the NLP 306.

NLP 306 receives the converted output text (translated if necessary) so that it can automatically extract keywords that might of interest to a user that subsequently plays back a recorded communication session. The NLP 306 may comprise a number of known algorithms and techniques in order to extract the keywords. These algorithms may include machine learning algorithms for keyword and keyphrase extraction such as "C4.5" and "GenEx" as described in "Learning algorithms for keyphrase extraction" by Turney, Peter D. (2000) (http://dx.doi.org/10.1023/A:1009976227802); and/or "TextRank"—a graph-based ranking model for text processing described in "TextRank: Bringing Order into Texts" by Mihalcea et al., (2004) (http://web.eecs.umich.eduhmihalcea/papers/mihalcea.emnlp04.pdf).

Other known NLP methods used by the NLP 306 may include the Microsoft Azure Machine Learning API which is configured to take the (translated) converted output text of the ASR 302 as an input and return a list of strings denoting the key talking points in said input text. The API employs techniques known from Microsoft Office's® sophisticated Natural Language Processing toolkit.

In summary the NLP 306 detects keywords and keyphrases that for example have a positive or negative intent. The NLP 306 may also extract keyphrases of an input text string determined to have a positive or negative sentiment. Further, dates and times recognised in the input string may be extracted as keywords. Also calendar events and locations can be extracted as keywords. The skilled person will understand that other types of keywords and keyphrases may be extracted by the NLP 306.

Each of the individual keywords and keyphrases extracted by the NLP 306 constitute the detection of an event by the NLP 306. A representations of each event detected by the NLP 306 is stored (as described later at step 408) wherein each of the representations include the extracted keyword or keyphrase text represented as a portion of text.

The stored audio data streams are also input to the audio analysis engine 308. The audio analysis engine may receive the audio data streams in parallel with the ASR 302. The audio analysis engine 308 analyses the audio properties of the input audio data for example to determine occurrences of silence, laughter, shouting, changes of speaker (user) in the communication session. Each time such a determination is made by the audio analysis engine 308 an event file is generated and stored (as described below at step 408). Representations of the events determined by the audio analysis engine 308 are stored so that the representations of the events include text based details of the occurrence of the audio events e.g. "[Applause]", "[Silence]", "[User X speaks]" and so on.

The stored video data streams are input to the video analysis engine 310. The video analysis engine 310 may use algorithms to analyse the visual nature of the video data for example to determine occurrences of gestures made by speakers (users) in the communication session, a visual ID displayed for a user, a significant change in the captured video. Examples of changes determined in the captured video may include a change of room or viewpoint and one or more users entering and/or leaving a room e.g. "user B has joined the session" or "user C has moved away from the camera". Identifying the user who has entered or left the room may be based on the video analysis engine 310 using facial recognition software. The facial recognition technique may be useful so that two or more users captured in a single video scene (e.g. co-presenters) may be determined to be two distinct users in the communication session. Each time a determination of any of these occurrences is made by the video analysis engine 310 a representation of the event is generated and stored (as described below at step 408). Representation for events determined by the video analysis engine 310 are stored so that the representations includes text based details of the occurrence of the video event e.g. "[Scene change]", "[Gesture: point]"; "[Gesture: wave]" sign language gestures and so on.

If screen sharing (including a slideshow presentation) is being performed as part of the communication session then the stored screen share communication data is input to the screen share/slide analysis engine 312. For example Optical Character Recognition (OCR) techniques may be used to analyse displayed text or handwritten annotations in a shared document. In scenarios where the screen sharing involves a digital presentation, OCR may not be necessary (e.g. sharing slides in slideshow presentation). When a first user in the communication session has given a presentation using a slideshow, the screen share/slide analysis engine 312 can determine when a new slide has been displayed, automatically extract the text of slide titles, as well as content within slides e.g. headings, subheadings, highlighted text and the like. Each time such a determination is made by the screen share/slide analysis engine 312 a representation of the event is generated and stored (as described below at step 408). Representations of events determined by the screen share/slide analysis engine 312 are stored wherein a representation includes the extracted text. When the screen share/slide analysis engine 312 determines that a new slide has been displayed and that slide has no title, the stored representation of the event may simply include text indicating the slide number (e.g. "Slide 3").

Occurrence of events may also be determined when any of the other applications 240 or online applications 340 running on cloud meeting platform 105 were used to transfer data in some way. For instance if one or more of the users in a communication session invoke one of the other applications 240 or online applications 340 its use may be determined as an event of a particular communication session. As one example, one or more users in the communication session can take notes during the communication session, by typing text or entering freehand annotations into a digital note-taking application e.g. Microsoft OneNote® (which is an example of an "Office 365" ® App 342 as shown in FIG. 3). The online note-taking application running on the cloud meeting platform 105 recognises that note(s) have been taken and generates a representation of the event. The representation of the event may include the actual text and/or freehand notes taken by a user. Alternatively, the representation of the event may be an indication that notes were taken by the particular user in the communication session. A user who takes notes may decide not to share them with other users in which case the notes will not be determined as an event and will remain private, accessible only to the user that made the notes.

As another example, edits on a document that is being shared may be recognised by the online application associated with handling the document. For example if any of the users in the communication session uses Microsoft Power-Point® to edit a slideshow presentation, then the online PowerPoint application (another example of an "Office 365" ® App) running on the cloud meeting platform 105 recognises the edit and generates a representation of the event for the edit. The generated representation of the event includes text based details of the edit e.g. "[Additional text added by user X]". The edit itself is also recorded as part of the recording of the communication session so that it can be seen when the recorded communication session is subsequently accessed and played back at a user terminal 102.

As another example a first user may use a photo application on his user terminal 102 to take and share a photo during a communication session. An online photo app 344 running on the cloud meeting platform 105 recognises that a photo has been shared and generates a representation of the event which includes text based details of the photo being shared e.g. "[Photo shared by user X]". In this case it may not be possible to record the sharing of the actual photo for subsequent playback at a user terminal 102. Instead the photo may be stored in the memory 352 of the cloud meeting platform 105 so that a user terminal 102 can access and download the photo at the appropriate point when playing back the recorded communication session.

Similarly in another example, a first user may share a contact card, participant list and/or calendar event data during a communication session. An appropriate online application such as Microsoft Outlook® or Microsoft Exchange® 346 running on the cloud meeting platform 105 recognises that such data has been shared and generates a representation of the event which includes text based details of the data being shared e.g. [New contact card received from user X], [new participant list receive from user X], and/or [new calendar event received from user X]. In this case it may not be possible to record the sharing of the actual data for subsequent playback at a user terminal 102. Instead the data may be stored in the memory 352 of the cloud meeting platform 105 so that a user terminal 102 can access and download the data at the appropriate point when playing back the recorded communication session.

At step 408 the resultant events determined from the analyses performed by the communication analysis software modules 300 are stored at the event store 314. The events may be represented and stored as event files 318 in the JavaScript Object Notation (JSON) format, although other formats may be used. Each event file 318 includes text and/or other visual representations for the event, a timestamp of when that event occurred during the associated communication session and an assigned relevance value (described in more detail below). The visual representation may be a portion of text data including text extracted from the full text transcript of the recorded communication session. The portion of text can be displayed and matched back with the recorded communication session when it is subsequently played back. Thus the events may be represented by a series of temporal metadata associated with a recorded communication session. The event files 318 may be concatenated so that a single analysis result file 320 is stored for each recorded communication session. The event store 314 may be a secure store that requires authentication for access e.g. a known authentication method such Active Directory authentication can be used before the metadata can be accessed.

In embodiments, as the data representing the metadata events are stored to the event store 314, a relevance module 356 may run an algorithm to assign a relevance value to each portion of text that represents an event. For example, certain portions of text may be determined to have the greatest relevance, such as the title of a slide in a slideshow presentation. The relevance value assigned may be an integer with higher value integers assigned to the most relevant portions of text. The range of assigned values may depend on the number of different types of event to have occurred in the recorded communication session. In embodiments portions of text representing some types of events may be deemed more relevant or more important than the portions of text representing other types of events and so are assigned a higher relevance value accordingly. In addition, different relevance values may be assigned to portions of text that represent events of the same type. For example, different keywords or keyphrases determined from the NLP analysis 306 are portions of text that may each be assigned a different relevance value level based on a comparison of the content of those determined keywords (or keyphrases).

A relevance value assigned to a portion of text representing a current event may be influenced by one or more relevance values respectively assigned to representations of one or more other events that occur soon after or before the current event occurs in the communication session. As an example, an audio event may be detected when the user who is speaking in the communication session changes. The representation of this audio event may be deemed to be important by the relevance module 356. The representation of the audio event is thus assigned a correspondingly high relevance value. In response, representations of events that occur within a predefined period of time following the change of speaker event may each be assigned a relevance value that is increased relative to the value that it would otherwise have been assigned. Therefore the importance of the change of speaker audio event is reflected in the representations of these following events.

At step 410 the stored communication data streams associated with a particular communication session are processed together and formatted into a media file 316 that may be stored at the non-volatile storage medium 352. That is, all of the received video and audio data streams of a communication session are synchronised into a media file 316 that recreates the communication session from start to end. Depending on the types of communication data streams, the media file 316 may be a video file or an audio file. For example, if the received data streams for a communication session comprise only audio data streams, then the data streams may be formatted into an audio file. For convenience we make reference to a video file 316 hereinafter. The step of generating and storing a video file 316 may be initiated by the cloud meeting platform 105 immediately upon receipt of the communication data streams at step 402. The video file may in any suitable format including but not limited to MP4, mpg, AVI, FLV, WMV, MOV.

In the main embodiment described the disclosure relates to a screen sharing method whereby one or more users shares a slideshow presentation. In this scenario, the output video for all of the receiving user terminals in the communication session will be the same. Therefore for any users wanting to subsequently play back the recorded communication session, the video file 316 will be the same for each user.

In alternative embodiments within the scope of the disclosure the communication session includes a videoconference interface whereby each communication client in a communication session is configured to output a video of the other user(s) in the session. The cloud meeting platform 105 may be configured to generate respective versions of the video file 316 where there is one for each of the users that took part in the call, plus a version for other users that were not part of the call. For example, if a user that took part in the call wants to play back the recorded session, his user terminal 102 will be able to access the video file 316 that is associated with him. This is so the user can re-experience the communication as it was originally displayed to him when the session was originally conducted. This is useful because a videoconference interface will usually be displayed differently at each respective user terminal 102 in the call. For users that did not take part in the communication session, a generic video file may be generated for these users in which all of the users that took part in the session are represented. In a further embodiment the cloud meeting platform 105 may be configured to generate and store only one video file 316 that is the same for all users that wish to subsequently pay back the recorded communication session. Examples in this scenario may include a video recording of a lecture or keynote presentation.

At step 412 the cloud meeting platform 105 associates all of the metadata (i.e. the event files 318 or analysis result file 320) from a communication session with the appropriate video file 316 for that session. The metadata may be encoded as part of the generated video file 316 itself, or it may remain separate from the video file 316, for example as a stream of side data. When encoded as part of the generated video file 316 (e.g. in MP4 format), the metadata may be embedded in the video file in a standard metadata format that may be recognised by the majority of standard media playing applications 280 and/or web clients (web browsers) 260. Such media playing applications 280 and web clients 260 may support the use of metadata for instance to navigate through chapters of a video and/or display the metadata in various ways (e.g. subtitles). These applications may be able to utilise the majority of the metadata described in the present disclosure. However, a new media playing application 280 and/or web client 260 that are configured to recognise the full range of metadata disclosed herein may need to be installed on the user terminal 102 so that a user can enjoy the full experience as disclosed herein.

The side data may include all of the event files 318 (or the single result analysis file 320). Alternatively, the side data may include a full transcription of the communication session as output by the ASR 302. The transcription may include text and indications of other visual representation (e.g. graphical icons). The user terminal 102 receives the transcript and may determine the occurrence of events and store metadata event files at the local memory storage 204, based on an analysis of the transcription performed at the user terminal 102.

In still further embodiments, the determination and storage of events (metadata) may be performed by the user terminal 102. For example the processor 200 of user terminal 102 may be configured to analyse the retrieved media file 316 directly itself and determine the occurrence of events from the recorded communication session. To achieve this, the user terminal may be configured with one or more analysis modules (not shown) similar to the communication data analysis modules 300 used at the cloud meeting platform 105. In this way the, the user terminal 102 is configured to convert the communication stream(s) of the recorded communication session to text. For any events determined from the transcription generated by the user terminal 102, these may be stored as event files (or as a result analysis file) in the local memory storage 204 similar to the event files 318 (or single result analysis file 320) that are stored at events store 314 at the cloud meeting platform 105. Therefore in embodiments the user terminal 102 only needs to access the video file (media file) 316 from the cloud meeting platform 105. It should be understood that the term "accessed" metadata as used throughout this disclosure encompasses all ways in which the metadata (i.e. event files or a single result analysis file) is obtained by the user terminal 102. Further, the user terminal 102 may be able to employ any one or a combination of the methods of accessing the metadata as described herein.

Alternatively or in addition to the cloud meeting platform 105 associating the metadata with the video file 316 (i.e. step 412 above), the cloud meeting platform 105 may be configured to send the metadata to the AV MCU 104a in real-time while the communication session is still ongoing. This may be referred to a live application of the cloud meeting platform 105. In this scenario, the metadata is thus incorporated into the communication session live, in real-time by the AV MCU 104a for all participants of the communication session. The visual representations of the events (displayed events) may therefore be shown live as they happen in a scrollable navigation area 612 of the media playing application 280 or web client 260 that is playing out the communication session. The scrollable navigation area 612 is described in more detail below. The visual representations may include a range of different types as described earlier such as portions of (translated) text output from the ASR 302, actions taken by users using other applications (e.g. photos taken, edits made to a slideshow presentation etc.) as well as representation of other audio and/or visual events.

The representations of events (displayed events) may also be shown in a "near real-time" playback of the communication session. For example, one or more users taking part in the live communication can select to pause the play out of the live communication session at their user terminal 102. For example, the user may pause the communication session in order to make or answer another call. While the communication session is paused for the local user at their user terminal 102, the communication session itself continues between the other participants and continues to be recorded as a video file 316 (as described above). Alternatively, or in addition, the communication session may be recorded in the background, to storage 204 of the user terminal 102. When the user is ready, they can select "resume" playback of the communication session. In response the user terminal 102 can access or download the video file 316 from cloud meeting platform 105 (or access the local recording of the communication session) from the point at which the communication session was paused. The user terminal 102 further accesses the metadata (as described above) that which means that visual representations of all events that have occurred in the communication session, including for events that have occurred since the communication session was paused may be displayed in the scrollable navigation area 612. Therefore, a user can catch up with the live session by effecting an inertia scrolling action in the navigation area 612 to scroll through the displayed events, which are synchronised with the relevant points in time of the recorded communication, to advance through the communication session until it catches up with the ongoing live session. This inertial scrolling concept is described in detail later. Alternatively, rather than using the inertia scrolling action, the user can select a button or some control to re-join the live, real-time communication session. Obviously the user cannot advance beyond the point in time of a communication session that still live. However, the user choose to "rewind" the session by scrolling backwards through displayed events that have already occurred earlier in the recorded session. For example this may be useful if the user thinks they may have missed something or wants to watch or listen to something in the session again. Of course, the user can once again select to return to the live, real-time communication session if it is still ongoing.

Therefore, although the main embodiments described herein refer to the recorded communication session, aspects of the present disclosure are also relevant to a live, ongoing communication sessions.

At step 414 when the communication session is complete, the cloud meeting platform 105 generates an email 500 that summaries in text, the contents of the communication session. The cloud meeting platform 105 may have knowledge of any users that were invited to be part of the communication but did not join it for whatever reason. In this case, the cloud meeting platform 105 may automatically send the email to these users who did not join in the communication session. Although we refer to email, the cloud meeting platform 105 may be able to send the text based summary by other communications means including instant messaging (IM) and/or SMS.

Another possibility is that the cloud meeting platform 105 can send a push notification to one or more users, notifying them that the recorded communication is available for them to access. The push notification may be displayed for example in the user's communication client 222. The user can then decide when to retrieve the text based summary. Alternatively the user may ignore or discard the notification. The email summary may also be sent to any of the users who did join in the communication session in case they want a convenient way of accessing and re-playing back the recorded communication session. Further still, the email summary could be sent to any other contact(s) with the permission of the host or an administrator. For example if there is no sensitive content in a recorded communication session, it may be beneficial to widely distribute the email e.g. to a wider team of co-workers or to a general mailing list.

Figure 5:
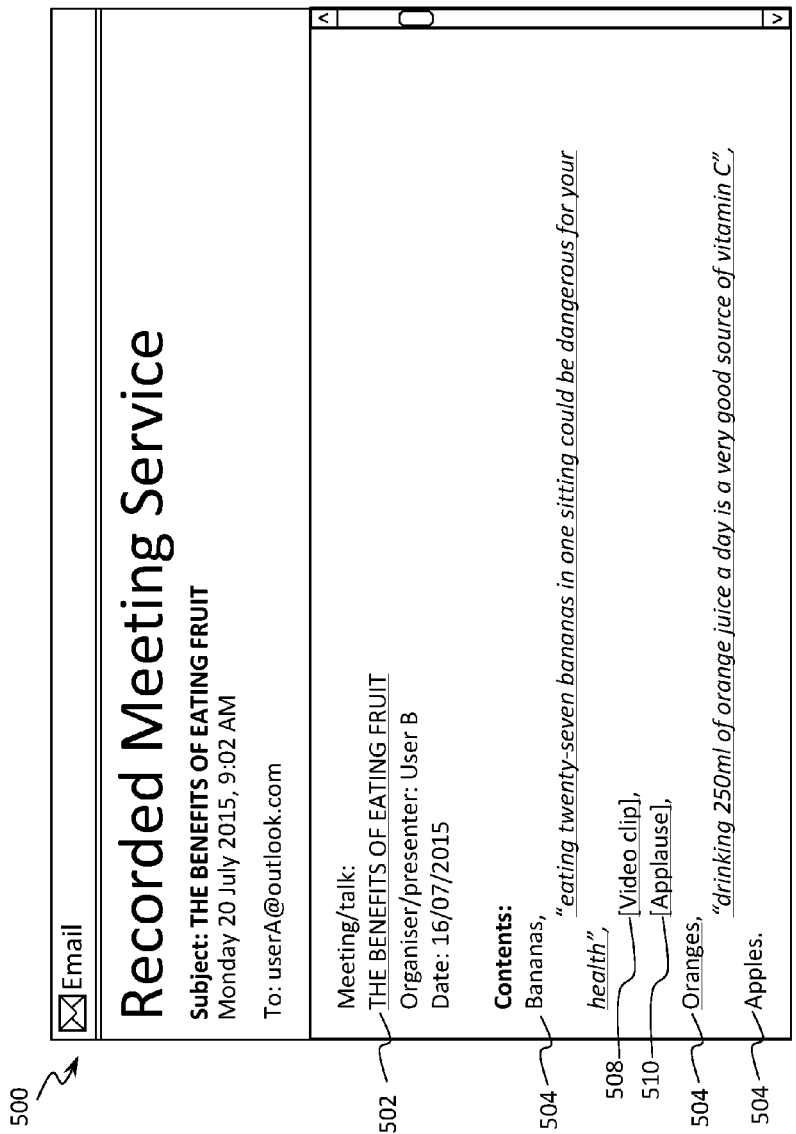
FIG. 5 is a representation of the contents of an electronic communication

FIG. 5 shows an example representation of the email 500 that summaries the content of the communication session in list form. The invite includes a first text link 502 to the recorded video file 316. The first text link 502 may appear as the title of the communication session e.g. based on the title of a shared slideshow presentation determined from the screen share/slide analysis 312 and read from the appropriate event file 318 (or the result analysis file). In the example shown in FIG. 5, the title of the presentation is "The benefits of eating fruit" as determined from the first slide. By tapping or otherwise selecting the first text link 502, a user terminal 102 will be able to access the video file 316 so that they can stream the video file or download it. When the user terminal 102 has accessed the video file 316 or has downloaded it, the file will play back in a media playing application 280 installed on the user terminal 102 (e.g. web client (web browser) 260 or media playing application 280), from the start of the recording. The recording plays back from the start because the first link 502 represents an event of the communication session which was determined during the data stream analyses to have occurred at the beginning of the communication and was thus time stamped with a time at the start of the communication session. The first text link 502 therefore links directly to the start of the start of the video file 316.

The summary email 500 may include further text links for example a list of titles of individual slides 504 in the slideshow presentation. As with the first text link 502, the titles of links 504 may be determined from the screen share/slide analysis engine 312 and read from the appropriate event file 318 (or the result analysis file). In the example shown there are three links 504 displayed with titles "Bananas", "Oranges" and "Apples". Other links may be shown as subheadings that represent events that were determined to have occurred during the presentation of a particular slide. For example one or more links in quotation marks 506 are based on what the NLP 306 deemed to be keyword or keyphrase spoken in the communication session. For example, under the "Bananas" link 504 there is displayed the link "eating twenty-seven bananas in one sitting could be dangerous for your health" while under the "Oranges" link 504 there is displayed the link "drinking 250 ml of orange juice a day is a very good source of vitamin C". Other links may be included and highlighted for example when a visual event occurred 508, or for when an audio event occurred 510. For example the visual event link "[Video clip]" 508 and the audio event link "[applause]" are shown under the "Bananas" link 504. It should be understood there may be more or fewer links, depending on the content of the communication session.

Thus each link in the email summary 500 corresponds to an event that was detected in the by the communication data analysis modules 300. As described, each of the links is based on a detected event wherein each event was time stamped with a point in time during the communication session. Each link therefore links directly to the corresponding point in time of the video file 316. Therefore by tapping on any one of the displayed links at any time, the first user terminal 102 accesses the video file 316 and is linked to the corresponding moment in time in the recorded communication session. The recorded communication session may be played out in a media playing application 280 running on the user terminal 102. Other applications, e.g. one or more of applications 240 or the web client application 260 running on the user terminal 102, may also be configured and suitable for playing out the recorded communication session. For convenience we refer only to the media playing application 280 for playing out the recorded communication session hereinafter. By tapping or selecting a particular links the playback of the recorded communication session is caused to skip forward or backward immediately to the point in time that corresponds to the timestamp of the event that the selected link is based on. The same link can be re-selected by a user many times so that they can keep playing back the recorded communication session from a particular point of time that may be of particular interest.

When a user terminal 102 accesses or downloads the recorded video file 316 it also accesses the event files 318 (or single result analysis file 320) associated with that recorded communication session. For example, if the video file 316 is downloaded, the event files 318 (or single result analysis file 320) is also downloaded from the cloud meeting platform 105. If the video file 316 is streamed from the cloud meeting platform 105 then the data relating to the event files data may also be streamed. Alternatively, if the event files 318 have already been encoded as part of the single video itself 316 at step 412 (described above), there will be no need to separately access the event files 318.

Figure 6A:
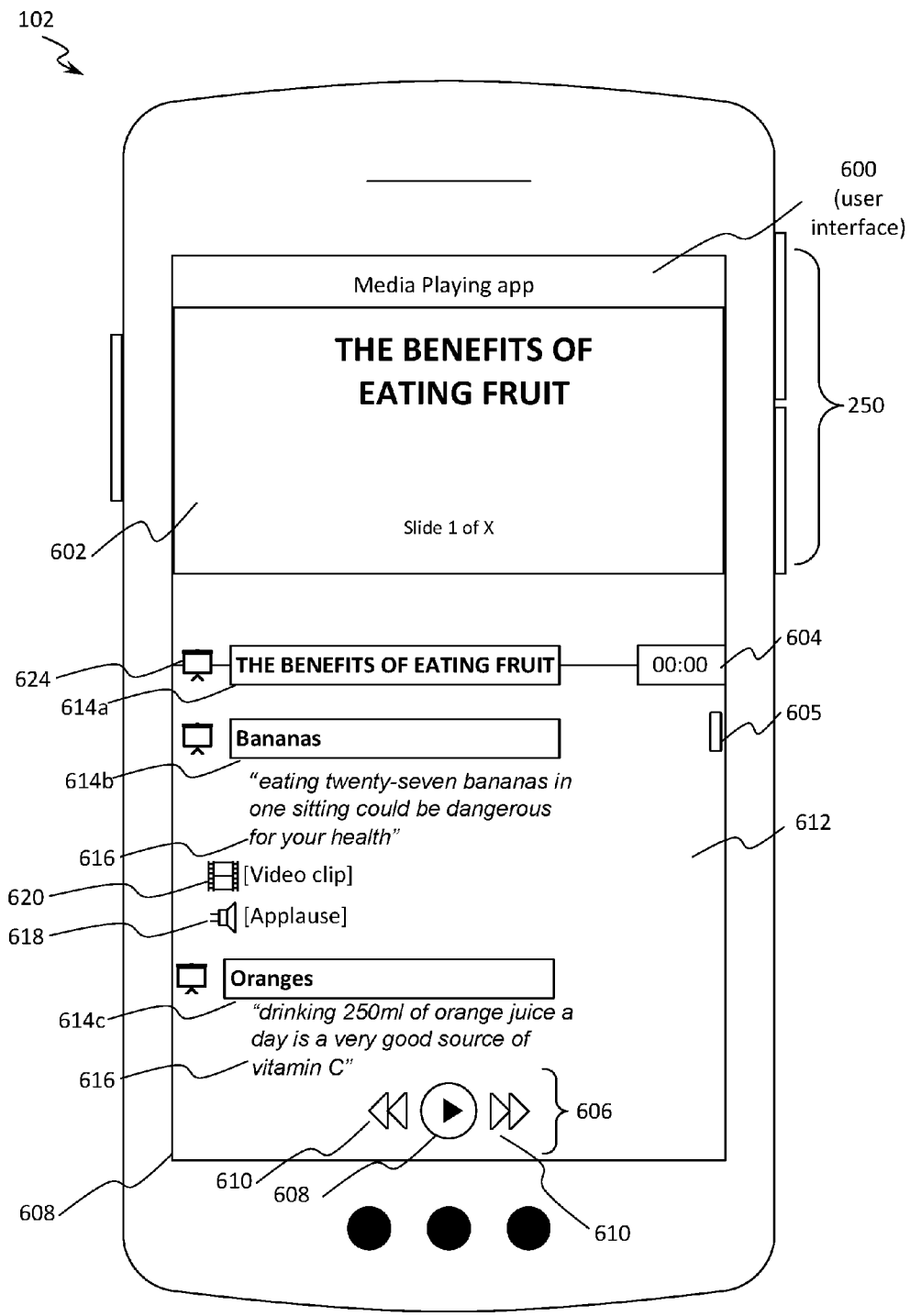
FIG. 6a is a schematic representation of a media playing application user interface running on the user terminal.

FIG. 6*a* shows a schematic illustration of an example user interface 600 of the media playing application 280 running on user terminal 102. The media playing application 280 is configured to play back a recorded communication session by playing the accessed video file 316. The media playing application may be an integral part of the communication client application 222 or it may be a separate application running on user terminal 102. When a recorded communication includes a video component, the video is displayed in a first area 602 of the media playing application user interface 600. The video component will include playback of all visual elements of the recorded communication session including displaying the slides of a shared slideshow presentation. The media playing application UI 600 further includes a time marker 604 that displays the point in time of the duration of the recorded communication session. Playback controls 606 include familiar on screen controls so a user can pause/resume the playback of a recorded communication session using button 608.

The audio playback of a recorded communication session is synchronised with the video component. The audio is played out from the media playing application (or the communication client application 222 if the media playing application is integrated with it) without interrupting the playout of any audio streams of other applications running on the user terminal 102. Thus if the recorded communication session is an audio only recording, or if the user does not need to or cannot see the display 208 then he may simply listen to the audio output.

Skip control buttons 210 allow a user to advance or go back to the point in time of the playback when the next or previous slide was introduced in the communication session. The skip control buttons 210 may also be used to advance or go back to the point in time when the next or previous detected event occurred. In embodiments a user setting may allow the user to advance or go back to the point in time when the next or previous type of event occurred, e.g. the user may want to skip though the occurrence of audio events only. Because the media playing application 280 has access to the metadata i.e. the event files 318 (or single result analysis file 320) it knows what point in time of the playback to skip to when the skip buttons 610 are selected. Therefore while the playback of the recorded session is a video rather than an actual slideshow, the metadata allows a user to effectively skip through the video on a slide-by-slide basis.

In embodiments a user may double-tap a skip control 210 to go back to the beginning or to the end of the recorded communication session.

As an alternative to using the playback control buttons 206, a user may be able to control the playback of the recorded communication session by interacting with the video displayed in the first area 602. For instance by tapping or clicking in area 602 the playback may be paused/resumed. Further by performing swiping actions on the video area in 602 (or by tapping or clicking on the left and right edges of the video in area 602) the playback will advance (e.g. swipe left/tap on right edge) or go back (e.g. swipe right/tap on left edge) to the point in time of the playback when the next or previous slide was introduced in the communication session. The ability to skip through the recorded communication session may be effected while the playback is being played out or while it has been paused. In embodiments if the user wants a larger view of the content displayed in area 602, he may rotate his user terminal 102 sideways to get a full screen view of the area 602. The skilled person would understand that such a determination of a sideways rotation may be made by the CPU 200 in conjunction with an accelerometer type device (not shown) of the user terminal 102.

If the recorded communication session includes only audio components, the user can still skip through to the next or previous events in the audio recording e.g. any events determined to have occurred from the NLP 306 and/or audio analysis engine 308. Although there is no recorded video component, the cloud meeting platform 105 may generate a visual element as part of the formatted video file 316. This visual element may be a static image that displays in area 602 (e.g. a sound wave symbol to indicate that an audio only communication session is being played back). Alternatively the visual element may comprise a series of images that visualise the progress of the playback of the recorded communication session. The images may also indicate the type of the most recent event that occurred in communication session by displaying a visual representation of that event. Therefore the user still sees some helpful visual cues in area 602 as to what occurred during the communication session.

As well as using the control buttons 606 displayed on the media playing application UI 600, the user terminal 102 may also include one or more physical controls, e.g. control buttons 650, which can also be used to control the playback of the recorded communication session in any of the ways as described herein. Alternatively or in addition, the physical controls 650 may be part of another input device 210 connected to the user terminal 102 e.g. a keyboard, mouse or headphone/headset controls.

In embodiments the media playing application UI 600 further includes navigation area 612. The metadata (event files 318 or single analysis result file 320) that is accessed by the user terminal 102 is visually represented and displayed in the navigation area 612. The metadata may be loaded so that each event that is represented and displayed is synchronised with the playback of the recorded communication session. Thus an event may be visually represented most prominently in the navigation area 612 when that event occurs in the playback of the recorded communication session. This is possible based on the timestamps included in each stored event file.

In embodiments the visual representations of the determined events for a recorded communication session may be loaded into the navigation area 612 so that they are scrollable. For instance at the start of a playback of a recorded slideshow presentation, the title 614*a* of the first slide (e.g.

the title of the presentation, the slide number and/or "START") may be displayed at the starting position which is aligned with the time marker 604. In the example shown in FIG. 6a, the playback has just started and so the time marker 604 shows as "00:00". Below the title of the first slide 614a are a number of other displayed events including: a subsequent slide title 614b ("Bananas"), a key phrase 616, audio event 618 ("[Applause]") and visual event 620 ("[Video clip]") each detected during the display of slide 614b, followed later on by another slide title 614c ("Oranges") and another keyphrase 616 detected during the display of slide 614c. Each type of displayed event may be denoted by a graphic 624 shown proximate to the text of a displayed event.

As the playback of the recorded communication session progresses the time marker 604 counts up and displayed events shown in the navigation area 612 automatically scroll up. In embodiments the next event to occur in the playback happens when the next displayed event in navigation area 612 is aligned with the time marker 204. If it has been determined that there are very few events, then all of those events may be shown as displayed events that can be scrolled through in the navigation area 612. On the other hand if it has been determined there are many events, then the corresponding displayed events in the scrollable navigation area 612 may be limited to the ones that have more relevance than others. This is determined based on the relevance value that was assigned to each portion of text that represents an event (as described above). Thus representations of lesser relevant events may not be displayed in the scrollable navigation area 612. The available screen area for navigation area 612 may also influence how many displayed events show up. For example if the screen area for navigation area 612 is limited, then to keep the navigation area 612 uncluttered, representations of events with higher relevance may be shown as displayed events while representations of events assigned with a lower relevance value may be omitted. Conversely, if the screen area for navigation area 612 is suitably larger, then some of the representations of events assigned with a lower relevance value may also be shown as scrollable displayed events along with the more relevant displayed events. The displayed events shown in the navigation area 612 may automatically scroll up at a pace based on when the next event occurs in the playback. For instance if the next event to occur is in one minute, the automatic scrolling can be paced so that the corresponding displayed event as displayed in navigation area 612 becomes aligned with the time marker 604 at the correct moment in time of the playback.

The scrolling of the displayed events are described as being synchronised with the playback of the recorded communication session. However the displayed events may have a higher resolution than e.g. change of slide and extracted keywords and keyphrases as described above. For instance, the navigation area may display a full transcript of the communication session as determined by the ASR 302 (or a local ASR at the user terminal 102). In this case the displayed events may be portions of the displayed text transcript e.g. broken down by paragraphs, sentences, words, phrases. The navigation area 612 scrolls through the displayed events e.g. sentence-by-sentence, all the while still synchronised with the playback of the media file 316. This allows for a much finer level of detail to be displayed in the navigation area 612 area.

In embodiments once a displayed event has occurred it may continue to scroll until it scrolls off the top of navigation area 612. Alternatively the current or most recent displayed event may stay aligned with the time marker 604 until it is replaced by the next displayed event. The previously displayed event that has just been replaced may then scroll upwards. Displayed events that have occurred but are still showing scrolling above the time marker 604 may optionally be shown "greyed out" to indicate the events of the recorded communication session linked to those displayed events have occurred in the playback.

In an embodiment, as the playback progresses a scroll marker 605 may be displayed which is shown to move downwards from the top to the bottom of navigation area 612. This gives the user some indication of how far into a recorded session they are. As the displayed events scroll up, the scroll marker 605 will gradually reach the bottom of navigation area 612 at the end of the recorded communication session.

Figure 6B:
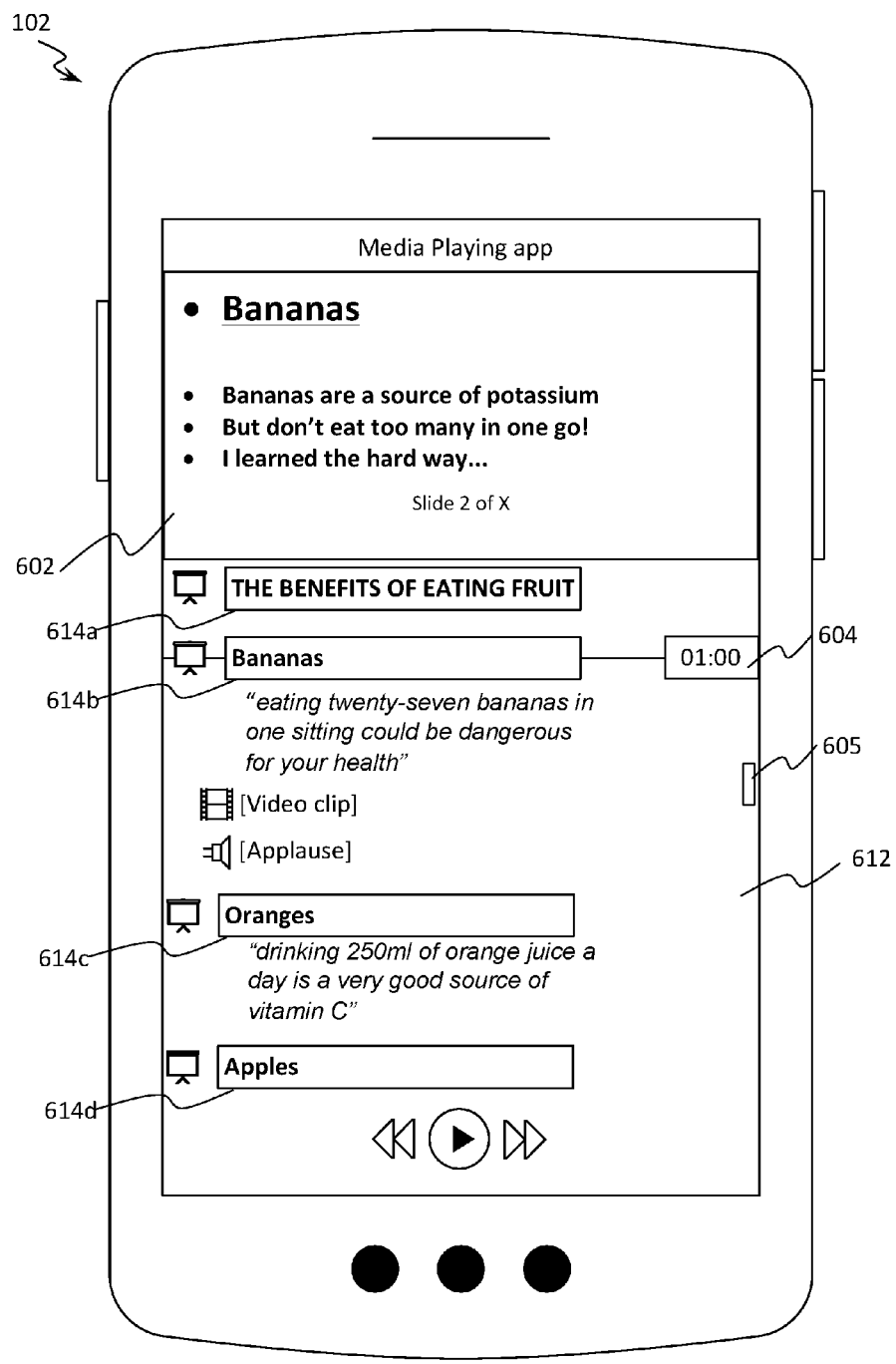
FIG. 6b is another schematic representation of the media playing application user interface running on the user terminal.

FIG. 6b shows an updated representation of the media playing application user interface 600 at time "01:00" as shown by time marker 604. The next slide after the title slide is now being displayed in area 602. The displayed event for first slide 614a in navigation area 612 can be seen to have scrolled above the time marker 604, while the displayed event for the current slide 614b ("Bananas") is now aligned with the time marker 604. A newly displayed event 614d ("Apples") is now shown to have scrolled "onto" the bottom of the navigation area 612 as the other displayed events have scrolled up.

All of the displayed events in the navigation area are 612 are also selectable by a user. If selected by the user, the playback jumps to the point in time of the recorded communication session based on the timestamp that links that displayed event to the event in the playback of the media file 316. The navigation area 612 is dynamically updated to show the selected displayed event in line with the time marker 604. The displayed events in the navigation area 612 then continue to scroll up again from this point as described above. Therefore the displayed events as shown in the navigation area 612 have a very similar purpose to the selectable links (502, 504, 506, 508, 510) displayed in the email summary 500. Selecting one of the links in email summary 500 or selecting the corresponding displayed event in the navigation area 612 has the same effect in the media playing application UI 600.

Inertial Scrolling

The navigation area 612 is also scrollable by way of user control. The media playing application uses an inertial scrolling technique such that the faster or harder a user performs a scrolling action up or down through the displayed events in the navigation area 612, the quicker the displayed events are scrolled (herein referred to as fast scrolling). When a user stops fast scrolling, the scrolling speed of the displayed events in the navigation area 612 gradually reduces until the normal play scrolling speed is reached i.e. when the play scrolling speed is synchronised with the audio playback, and wherein the audio playback is played out at the same rate as which it was originally recorded (hereinafter referred to the normal speed of the audio playback). Alternatively the user may perform inertia scrolling of the displayed events in the navigation area 612 while the playback of the recorded communication session is paused. In this case when the user stops scrolling, the scrolling speed of the displayed events in the navigation area 612 gradually reduces until it stops. The usual upward scrolling of the displayed events resumes when the user selects to resume playback of the recorded communication session. In embodiments, the inertial scrolling effect means that the displayed events in the navigation area 612 are scrolled in a continuous fashion. That is, the displayed events appear to move up through the navigation area 612 in a continual, fluid motion and do not jump from one discrete displayed event directly to the next displayed event.

Although the displayed events are described as scrolling upwards in the present disclosure, in alternative embodiments the displayed events may scroll down or in a sideways motions e.g. either from left-to-right or from right-to-left in the navigation area 612. In any case, while scrolling through the displayed events in the navigation area 612, the time marker 604 may be updated dynamically, based on the speed of the scrolling, to reflect the points in time the user is scrolling through. The time marker 604 will run backwards or advance forwards in time as the user scrolls through past or future displayed events of the communication session.

In embodiments, the scroll marker 605 may be shown only while the user performs a scrolling action in the navigation area 612. For example when the user stops interacting with the navigation area 612, the scroll marker 605 may disappear, either immediately or gradually fade away. Alternatively, the scroll marker 605 may remain visible at all times. If the user scrolls all the way to the start or end of a communication session, the scroll marker will reach the top or bottom of the navigation area 612 and move no further. The time marker 604 will also stop at "00:00" i.e. the start of the recorded communication session, or at the time duration that denotes the very end of the communication session.

In embodiments, when the user effects scrolling of the displayed events in the navigation area 61, the audio component of the recorded communication session is still played and remains synchronised for the user to hear. The faster the user scrolls through the displayed events, the faster the audio component of the recorded communication session is played out. By using one or more audio algorithms at the media playing application (or cloud meeting platform 105 if the video file 316 is streamed) the playback of the audio component can be sped up and slowed down but processed so that it remains intelligible to the user. For example segments of audio data that are not associated with an event may be played through at a higher speed based on how fast the user is scrolling through the displayed events shown in navigation area 612.

However other segments of audio may be associated with an event e.g. a segment of audio from which an occurrence of a keyword or keyphrase event was derived by the NLP 306 and/or from which an event was generated by the audio analysis engine 308. For these segments of audio the rapid audio playback may be briefly slowed to normal or near normal speed so that the user can clearly understand the audio associated with the event. If the user realises that what they hear is of interest, they can stop scrolling, in which case the playback will continue from where it is playing and at normal speed. The video component of the recorded communication session at 602 will also be updated to play from the relevant point in time. If on the other hand the user decides that they are not interested in the segment of audio, they can continue scrolling through the displayed events in navigation area 612 so that the audio playback speeds up again.

If the user is scrolling through the displayed events in navigation area 612 but at a moderate pace, the audio component playback may be sped up accordingly without needing to slow down for segments of audio that are associated with events. For example the audio playback may still be deemed intelligible up to a certain scrolling rate and therefore there is no need to bring the playback speed of the audio back down to the normal play out speed.

In embodiments the scrolling rate of displayed events in navigation area 612 may be limited by the media playing application 280. For example the media playing application 280 may impose a maximum scrolling rate that cannot be exceeded. As a result the playback speed of the audio component is similarly limited as the playback remains synchronised with the scrolling rate. This may be useful to ensure that the playback speed of the audio component does not become so fast that it is becomes potentially unintelligible to the user.

In embodiments where the user scrolls through the displayed events in the navigation area 612, the audio algorithms may include a "Pitch Synchronous Overlap and Add" digital signal processing technique so that the audio playback can be sped up but correcting for pitch alterations. This way the, the audio playback can be sped up but whilst compensating for any unnatural increase in pitch that occurs as a result. This method may be particularly beneficial for audio speech signals.

Audio algorithms can also be used for when the user scrolls backwards through the displayed events shown in the navigation area 612. In this case the audio playback is quickly played backwards. However known techniques can be used so that although the audio progresses backwards in time, short samples of the audio is played out in fast forward. Thus because the audio is not played back in reverse, the user may be able to pick out snippets of the audio that are played out in fast forward. As with the above described embodiment for segments of audio that are associated with an event, the rapid audio playback may be briefly slowed to normal or near normal speed so that the user can clearly understand the audio associated with the event. As before, the user can decide to either stop scrolling backwards in which case the playback will continue from where it is playing and at normal speed. Alternatively the user can continue scrolling backwards through the displayed events so that the fast rewind audio playback technique is resumed.

As described above, if using the inertial scrolling feature of the media playing application 280, when the user stops fast scrolling through the displayed events in navigation area 612, the scrolling speed gradually reduces until the normal playback scrolling speed is reached. Also, as described above, the audio algorithms may be configured to synchronise the speed of the playback to the speed of the scrolling. Therefore in embodiments, during playback of the recorded communication session, the playback speed of the audio component may be gradually reduced back to the normal playback scrolling speed as soon as a user stops fast scrolling through the displayed events in navigation area 612. If the user stops fast scrolling through the displayed events in navigation area 612 while the playback is paused, the playback remains paused but when the user resumes playback, the playback will resume from point in the recorded communication session that corresponds to where the user has scrolled to.

The above embodiments are described in relation to scrolling of displayed events in the navigation area 612. However, in alternative embodiments there may be no determined events in which case navigation area 612 will not be populated with the text of that represent those events. However the navigation area 612 may still be scrolled by a user to control the playback speed of the audio component as described above.

By allowing the user to scroll backwards and forwards through all of the displayed events in navigation area 612, the user can quickly and easily navigate to an appropriate displayed event in the playback of the recorded communication session, including displayed events that representing events that have previously occurred in the playback. While the user is scrolling through the displayed events in the navigation area 612, the video display of the playback at 602 may be kept synchronized with the scrolling of the displayed events. In embodiments to save processing and power resources in this scenario, the playback of the video may include outputting only key frames of the video. Optionally the key frames may also be at a reduced resolution. Alternatively, when the user is scrolling through the displayed events in the navigation area 612, the video display of the playback at 602 may be paused at its position in order to save processing and power resources. Rapidly updating the video to reflect the displayed events that are scrolled through will be resource intensive. Therefore, the video of the recorded communication session at 602 may be updated only when the user has stopped scrolling through the displayed events. However, the time marker 604 may be updated dynamically to reflect the points in time the user is scrolling through. Thus the time marker, together with the displayed events, the scroll marker 605 and the synchronised audio playback give a user a good indication of what is happening in the recorded communication session. In an alternative embodiment, the video component is updated if the scrolling speed as controlled by the user is either at the normal playback scrolling speed or at a speed that is determined by the media playing application 280 to be within predetermined range of the normal playback scrolling speed e.g. +/−10% of the normal playback scrolling speed.

Zoom Function

In embodiments the number of separate portions of text (representations of events) displayed in the navigation area 612 may be based on the relevance value that has been assigned to each portion of text and on a user-controllable zoom level function of the navigation area 612. When the portions of text are stored and assigned a relevance value as part of step 408 (described above), the relevance module 356 algorithm also works to associate each relevance value with a zoom level of the navigation area 612. For instance, portions of text that are deemed to have the highest relevance may be associated with the lowest zoom level of the navigation area 612. The lowest zoom level (i.e. the most zoomed out) may be considered as "an overview" zoom level. In an example embodiment a portion of text representing a change of slide in a slideshow presentation may be assigned the highest relevance. Therefore these portions of text are then associated with the overview zoom level. As a result when the zoom level of the navigation area 612 is controlled to be zoomed out to the overview zoom level, only those portions of text with a relevance value that has been associated with the overview zoom level will be displayed in the navigation area 612. The overview zoom level may be set as a default starting zoom level for the navigation area 612 when playback of a recorded communication session is initiated. Similarly, and as explained in more detail below, lower relevance values are respectively associated with more zoomed in levels of the navigation area 612. Therefore when the media playing application 280 zooms the navigation area 612 in to a zoom level that has been associated with a lower relevance value assigned to one or more portions of text, those portions of text (plus portions of text with a higher relevance value assigned) will be displayed in the navigation area 612. Thus when zoomed in or out the navigation area 612 is configured to display portions of text of differing levels of relevance so that the user can quickly and easily see an appropriate level of detail as required.

In an alternative embodiment, rather than the relevance value being assigned by the relevance module 356 algorithm at the cloud meeting platform 105, the relevance value may be determined by an algorithm which is run at the user terminal 102 (hereinafter "user terminal relevance algorithm"). When the metadata (event files 318 or single analysis result file 320) is accessed by the user terminal 102, the user terminal relevance algorithm can analyse and compare the individual portions of text representing each event and assign a relevance value to each one.

In embodiments, the assigned relevance value (assigned by either the relevance module 356 or the user terminal 102) may be based on actions exhibited by a number of users of the communication system 100. That is, it may be said that the assigned relevance value is "crowd sourced". As one example, users participating in a communication session can submit live feedback in response to what they are watching and/or listening to. The feedback may be submitted by way of a "Like" button presented in a user interface of the user terminal 102. This feedback may be sent to the cloud meeting platform 105 optionally via the AV MCU 104*a*. The feedback may be collated from any number of users, e.g. from hundreds to potentially millions of users that watch a presentation. The feedback is then utilised by either the relevance module 356 or the individual user terminals 102 in assigning the relevance value. For a detected event that correlates with a peak in positive feedback (i.e. a large a number of received "Likes"), the relevance value assigned to the portion of text representing that event is increased relative to the value that it would otherwise have been assigned. Therefore the relevance of representations of events may be based on a level of popularity associated with that event as it occurred in the communication session.

Still further, the crowd sourcing technique may be based on how users interact with the play back of the recorded video file 316. That is, feedback as described above may be submitted from the user terminals 102 as users play back the video file i.e. rather than submitting feedback as part of the live communication session. Therefore, in this scenario, a relevance value that has already been assigned to the representation of an event may be increased or decreased (either by the relevance module 356 or the user terminal 102 as explained above). Thus the representation may become more relevant or less relevant over time based on the feedback from users. For instance, the feedback could be submitted by way of a "Like" button similar to the embodiment described above causing the representation of a popular event to have an increased relevance assigned. Other ways of receiving feedback include monitoring how the users (at large) navigate the recorded video file 316. For example, popular points in time of the playback may cause an increased relevance value to be assigned to the representation of events occurring at those points in time. As another example, a user can enter search terms to search the content of the event metadata for particular representations of events (as explained in more detail below). Search terms and/or selected search results can be sent as feedback to the cloud meeting platform 105. Thus popular search terms and/or search results among the users can be determined by the cloud meeting platform 105. Based on this crowd-sourced information, an increased relevance value may be assigned to the representation of events that relate to the popular search terms and/or search results.

Thus, by tracking feedback of the users' interactions with the downloaded video file 316, the relevance values assigned to the representations of the events may be regularly updated to reflect the overall behaviour of those users. In this way, user terminals 102 that subsequently access or download the video file 316 from cloud meeting platform 105 will also have access the most up-to-date metadata. User terminals 102 that have already accessed the video file 316 may be configured to download the updated metadata as a stream of side data from the cloud meeting platform 105.

The respective zoom levels associated with the assigned relevance values may also be determined by the user terminal relevance algorithm at the user terminal 102, rather than by the relevance module 356 algorithm at the cloud meeting platform 105. In this case, the user terminal relevance algorithm can further take into consideration the display size area available for navigation area 612. For example, the zoom levels associated with the assigned relevance values may be pre-computed in advance of a user controlling the zoom level of the navigation area 612. Alternatively, the assigned relevance values may be associated with a zoom level each time a user controls the zoom function by zooming in or zooming out of the navigation area 612.

Although potentially more processor intensive, it may be beneficial to associate the relevance of portions of text with a zoom level as a user controls the zoom function because the size of the available area of navigation area 612 can then be taken into account. For instance if the navigation area 612 is determined by the media playing application 280 to be sufficiently large, then more portions of text can be displayed without crowding the navigation area 612. For example more portions of text, possibly including portions of text with a lesser degree of relevance than portions of text that are already displayed in the navigation area 612, can also be displayed. By contrast, if the navigation area 612 is small, then the user terminal relevance algorithm may be configured to give priority to the portions of text assigned with the highest degree of relevance as the navigation area 612 is zoomed out. This helps to ensure that the navigation area 612 is not overcrowded with displayed portions of text. In still further embodiments, the zoom level of the navigation area 612 may be dynamically adapted by the media playing application 280 based on the size of the navigation area 612 alone i.e. without the user controlling the zoom function. This may be useful if the navigation area 612 is resized during playback of the recorded communication session.

Figure 7A:
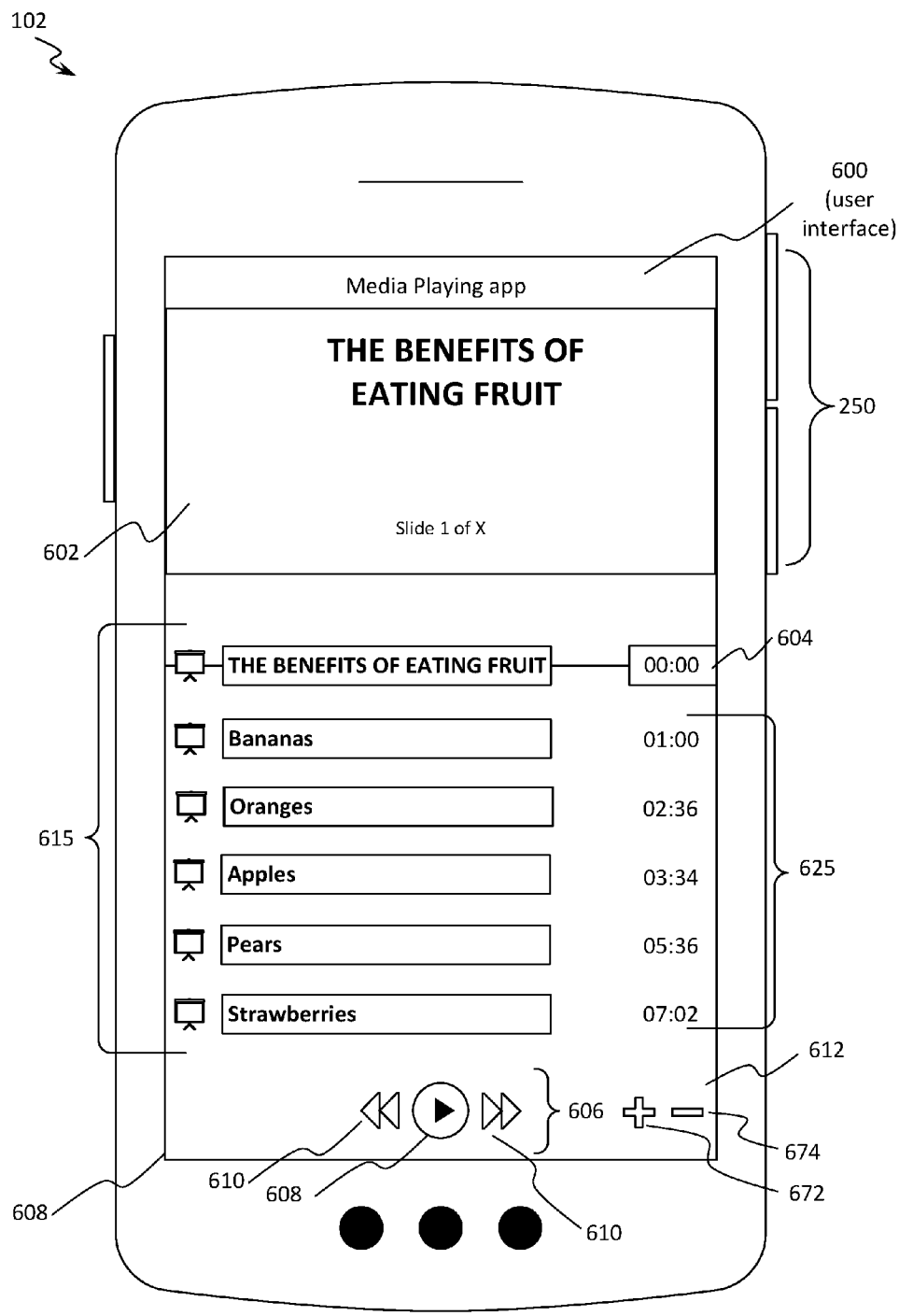
FIGS. 7a to 7d are further schematic representations of the media playing application user interface during a "zoom function" mode.

FIG. 7a depicts the example scenario where the navigation area 612 has been zoomed out to the overview zoom level such that the portions of text displayed in the navigation area 612 represent each slide change 615 which have been assigned with the highest relevance value. Each change of slide 615 is shown as the title of the new slide which is determined by the screen share/slide analysis module 312. If there is no title for any particular slide or page, it may be shown represented in the navigation area 612 by the slide number or page number e.g. "Slide 5" or "Page 5". The time marker 604 is shown at "00:00" i.e. at the start of the playback. As a result the first slide titled "The Benefits of Eating Fruit" is shown in displayed in the first area 602. If the zoom function is not altered during playback of the recorded communication session, then as described above, the displayed events (portions of text) scroll up the navigation area 612 as those events occur in the playback of the recorded communication session.

A user may control the zoom level of the navigation area 612 by way of the zoom control buttons 672 and 674 displayed in the web client user interface 600. By tapping or otherwise selecting button 672 (zoom in, "+"), the navigation area 612 is zoomed in causing the media playing application 280 to populate the navigation area 612 with more displayed portions of text which have been assigned a lower relevance value. By contrast, tapping or otherwise selecting button 674 (zoom out, "−"), the navigation area 612 is zoomed out causing the media playing application 280 to reduce the volume of displayed portions of text in the navigation area 612 such that only portions of text which have been assigned a higher relevance value are displayed. If the zoom level is fully zoomed in or fully zoomed out, the appropriate control button 672 or 674 may be "greyed out" to indicate the user cannot control the zoom in that direction any further.

Although the onscreen zoom controls are shown as buttons 672, 674, the zoom may be controlled by other means such as a virtual slider control. When the user zooms through the different zoom levels a label beside the zoom control may be temporarily displayed to indicate the zoom level e.g. "overview zoom level", "maximum zoom level" and the like. Depending on how many different zoom levels there are for displaying the portions of text (i.e. based on the number of different assigned relevance values), the different zoom levels may be graded accordingly e.g. if there are four discrete zoom levels for displaying the portions of text in the navigation area 612, the zoom control may display the zoom level as one of "1/4", "2/4", "3/4", and "4/4".

Control of the zoom function may be implemented so that each time a user taps or selects the zoom in or zoom out controls, the media playing application 280 is configured to cause the zoom level of the navigation area 612 to be zoomed to the next zoom level that has been associated with a relevance value. The media playing application 280 then displays the portions of text that have been assigned with the appropriate relevance value(s) in the navigation area 612.

The zoom levels respectively associated with the assigned relevance values may be implemented by using floating point zoom values such that the user can dynamically zoom in and out of the navigation area 612 without the zoom levels 'snapping' or 'locking' to predefined discrete zoom levels. When a user controls the zoom function of the navigation area 612 such that it reaches a floating point value that has been associated with a relevance value assigned to one or more portions of text, those portions of text (plus portions of text with a higher relevance value assigned) will be displayed in the navigation area 612. This may provide for a more fluid and natural user experience.

The control buttons may also be used to effect a change in the zoom level of the navigation area 612, for example by way of discrete control buttons and/or a wheel control. Other ways of zooming in or out of the navigation area 612 may be known to those skilled in the art and may include, but are not limited to, touch screen controls such as making pinch and expand gestures.

Figure 7B:
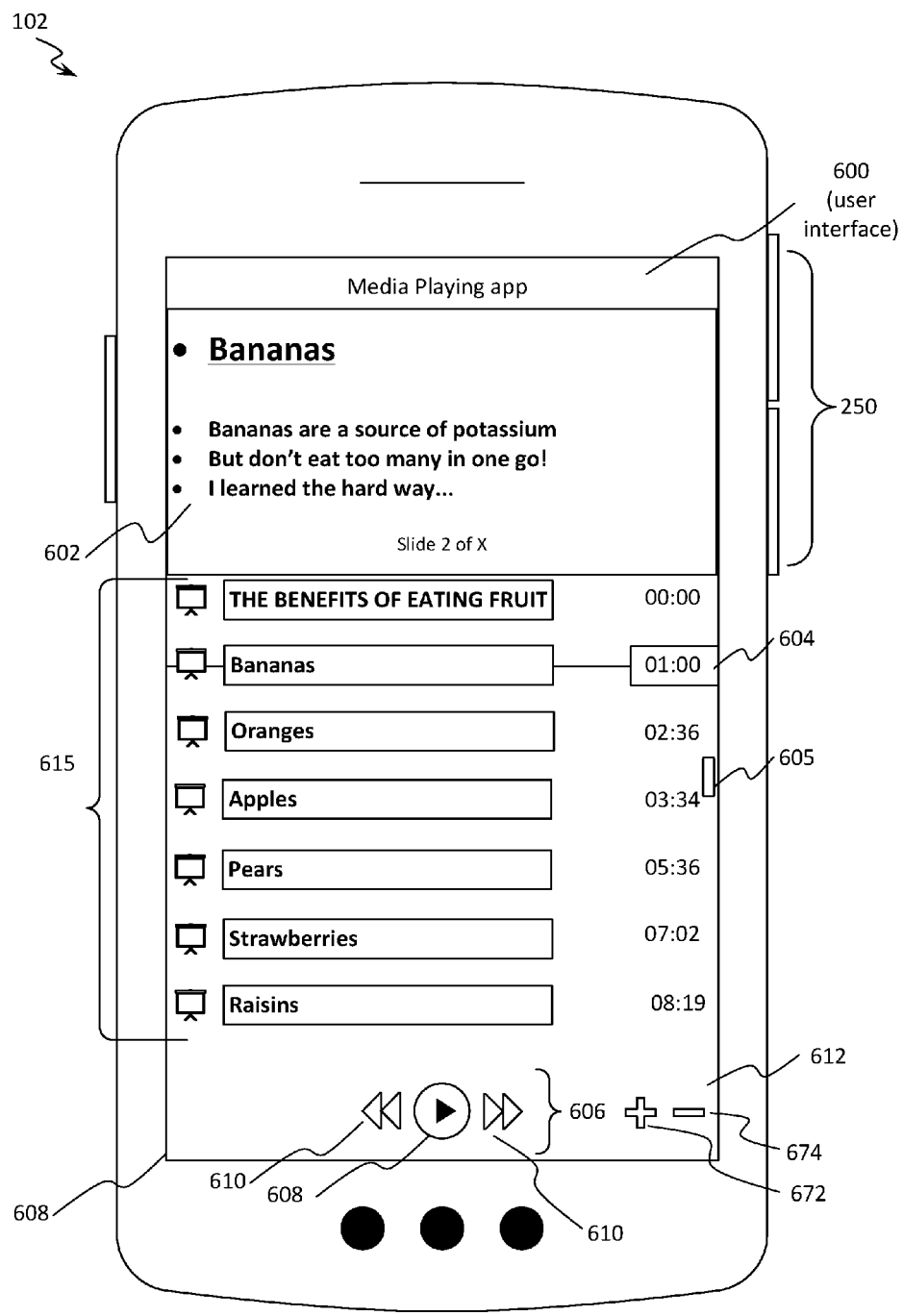

FIGS. 7b to 7b show the same media playing application user interface 600 playing back the same recorded communication session but at subsequent temporal points in the playback and at progressively zoomed in levels of the navigation area.

In FIG. 7b the playback has advanced to "01:00" and the next slide is being displayed. At this point the zoom level is still at the overview zoom level such that only the portions of text with the highest relevance are still displayed in the navigation area 612. At some point during the playback the zoom function of the navigation area 612 may be controlled to be zoomed in further. This is shown by FIG. 7c.

Figure 7C:
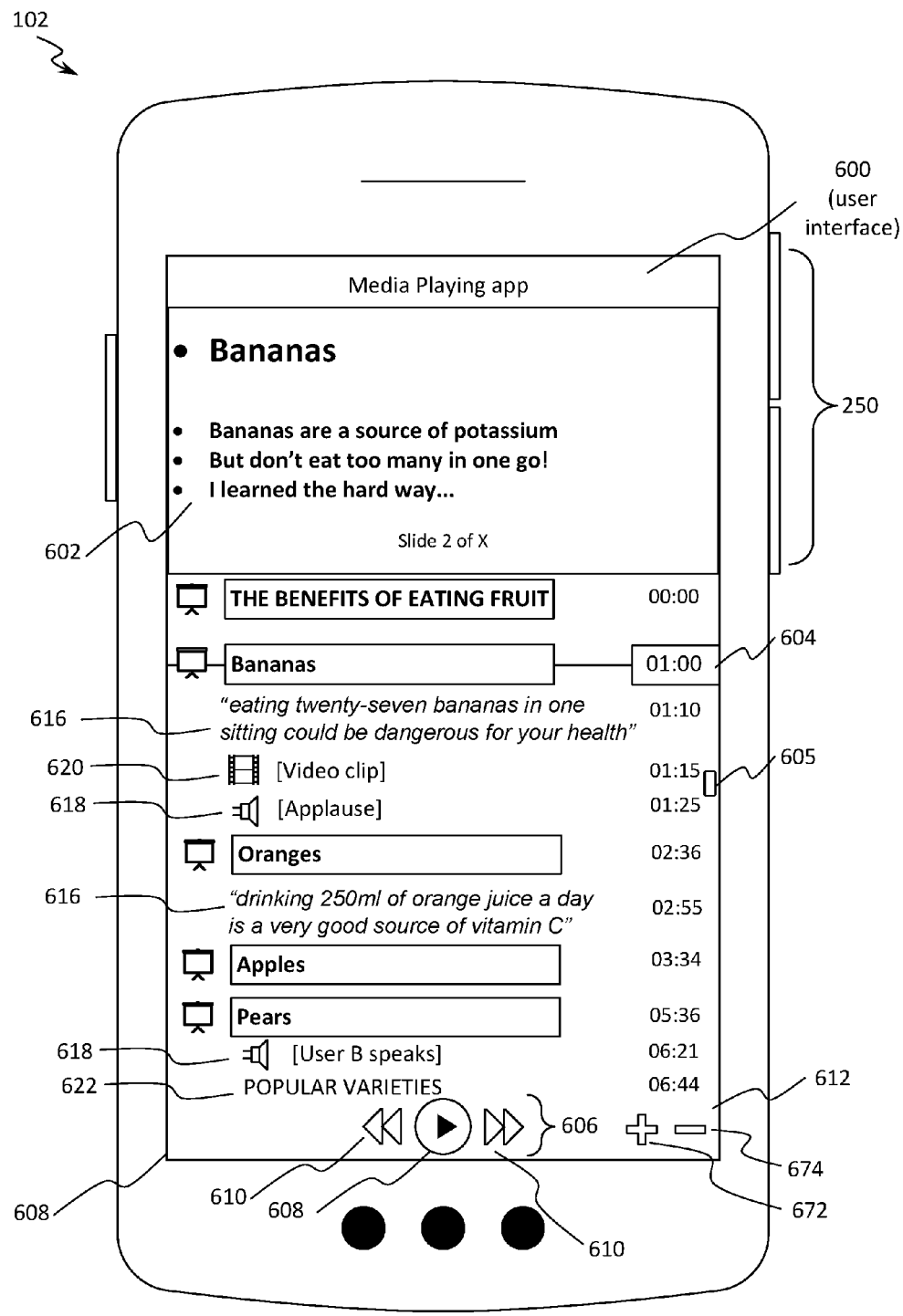

In FIG. 7c, the zoom level has been increased meaning that portions of text with a relevance value that is equal to or greater than the relevance value that is associated with the new zoom level will be displayed in the navigation area. Therefore some portions of text that are deemed to be of a lesser-relevance than other portions of text are now included in navigation area 612. These lesser-relevant portions of text may provide more detailed information that can aid the user in navigating the recorded communication session. These lesser-relevant portions of text may be associated with a section of a recorded communication session for which one or more more-relevant portions of text have also been associated. That is, the lesser-relevant portions of text which have been assigned a lower-relevance value may provide more details about a portion of a recorded communication as compared with a portion of text which has been assigned a greater relevance value. Although referred to as "lesser-relevant", these portions of text when displayed in the navigation area 612 offer an important source of information that at times may be particularly useful to a user. For example, these newly displayed lesser-relevant portions of text may include one or more of: a detected keywords and/or keyphrase 616 based on the NLP analysis 306; an indication of an audio event 618 (e.g. silence, laughter, applause, music, change of speaker etc.); an indication of an a visual event 620 (e.g. gestures, video clips etc.); and/or an indication of an event 622 detected from the screen share/slide analysis 312 (e.g. text subheadings, text elements e.g. based on OCR capture).

As the navigation area 612 is zoomed in, the playback of the recorded communication session continues uninterrupted and the portions of text (displayed events) may scroll up through the navigation area 612 as described above. Optionally, each displayed portion of text may also be displayed with a time marker 625 which indicates the point in time in the recorded communication session at which the event it represents was detected. For example in FIG. 7c, an "[Applause]" text portion represents the occurrence of an audio event at "01:25" into the recorded communication session.

In embodiments, a user may be able to select the range of relevance values that get assigned to the portions of text. For example if there is a great number of events a user may select a user setting to use a wider range of relevance values. According to the range of relevance values available, the relevance module 356 (or the user terminal 102) must then assign the portions of text with one of the available relevance values, determining which of the portions of text are more relevant than other portions of text. For example, a keyphrase may be determined to be more relevant than an audio event. By using a greater number of different relevance values, there is a correspondingly greater number of zoom levels that become associated with those relevance values. Therefore a user is provided with a finer granularity for changing how the portions of text of varying degrees of relevance are displayed as the media playing application 280 zooms in and out of the navigation area 612. Conversely, the user may reduce the range of available relevance values such that there are fewer ways of displaying portions of text of varying degrees of relevance as the media playing application 280 zooms in and out of the navigation area 612.

Figure 7D:
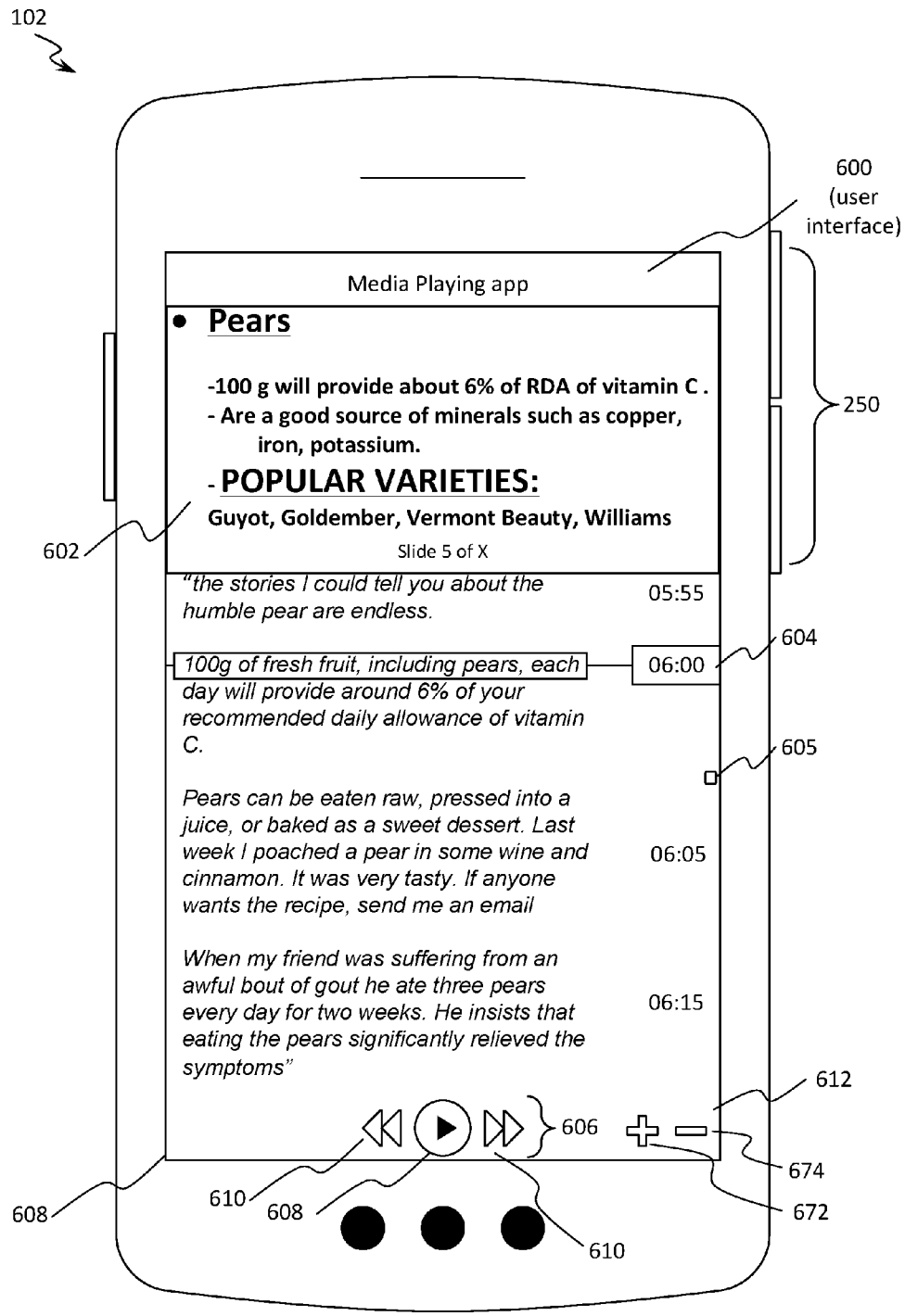

In FIG. 7d, the playback of the recorded communication session has advanced to "06:00" and the navigation area 612 has been zoomed in to the highest zoom level (i.e. most zoomed in). In this case the media playing application 280 is configured to display the full transcription of the recorded audio data stream as output by the ASR 302. The full transcription may be deemed to be a portion of text with the lowest possible relevance value. Other determined portions of text assigned a higher relevance value may also be included or may be disabled so as to prevent interrupting the flow of the displayed full transcription. The full transcription can be scrolled through by the user in which case the playback of the communication session may remain synchronised, as described above. The time markers 625 may be displayed for each section of text (e.g. paragraph or detected change of topic) so as not to overcrowd the navigation area 612.

In embodiments when a user controls the zoom function of the navigation area 612, he may not want to alter the position of the playback of the recorded communication session. Therefore in one embodiment the zooming of the navigation area 612 is controlled so that it is centred on the current playback position as the user zooms in or out. That is the zooming will centre on whichever portion of text is aligned with the time marker 604. The playback of the media file 316 is unaffected and continues uninterrupted by any changes to the zoom level. The user may also zoom in and out of the displayed portions of text while the playback is paused.

In an alternative embodiment the user may want to use the zoom function to actively alter the position of the playback of the recorded communication session. For example, if the user selects to zoom in or out of a particular area within the navigation area 612, then the media playing application 280 controls playback of the recorded communication session so that it jumps to the nearest portion of text to which the user has zoomed in to (or zoomed out to) and continues to play from that point i.e. the playback will remain synchronised to whichever portion of text the user zooms in or out to. The navigation area 612 is updated to show the appropriate portion of text (or part of the full transcription) displayed aligned with the time marker 604. The displayed portions of text (or transcription) from this point on may continue to scroll up the navigation area 612, as described above.

As described above, all of the displayed portions of text in the navigation area 612 are also selectable by a user. If selected by the user, the playback jumps to the point in time of the recorded communication session based on the timestamp of the event that the portion of text is representing. If the navigation area 612 has been zoomed in to view the full transcript of the audio component, then each sentence may be selected so that the playback jumps to that point in time of the recorded communication session. The navigation area 612 is dynamically updated to show the selected portion of text (or part of the full transcription when fully zoomed in) aligned with the time marker 604. The displayed portions of text (or transcription) from this point on may continue to scroll up the navigation area 612, as described above.

Figure 8:
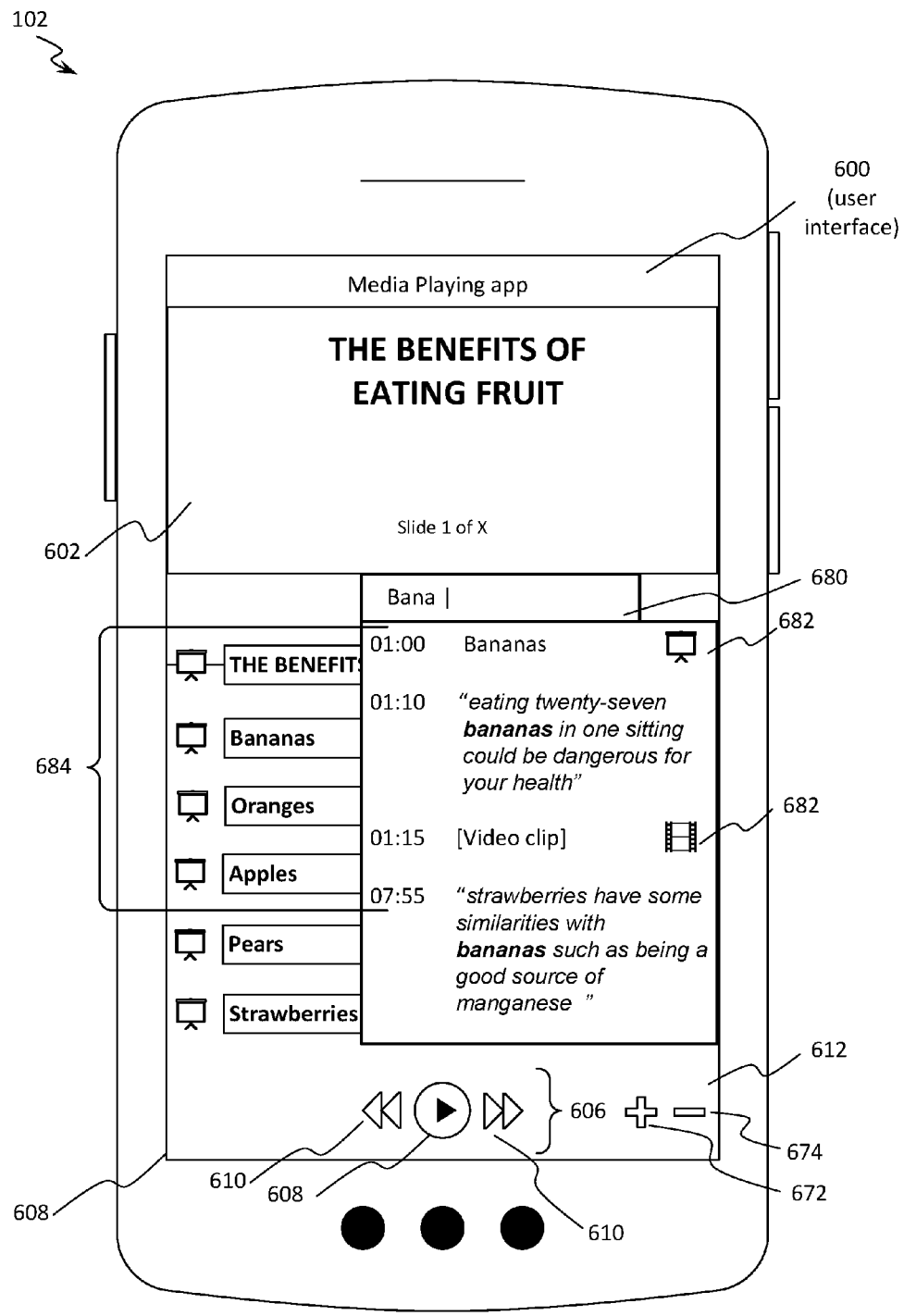
FIG. 8 is another schematic representation of the media playing application user interface performing a search function.

Referring to FIG. 8, in embodiments the media playing application UI 600 may further include a search box 680. A user may input a search term in the form of a text string. Alternatively the search term may be spoken and recognised by a speech recognition module running on the user terminal 102 (not shown). The search term can be entered either during playback of the recorded communication session or while it is paused. The media playing application 280 looks through the content of the event metadata for results that match the entered search term. The results may match in a broad sense e.g. searches may automatically look for relevant variations of searched terms including synonyms, singular and plural forms, and potential misspellings. Alternatively or in addition, the search can make use of Natural Language Processing methods. For instance a search for "fruit" might give results of keywords and/or keyphrases including related text such as "Banana(s)", "Orange(s)", "Apple(s)" and so on.

Searches can be made for content of the metadata (e.g. the content of the text output from the ASR 302, or text determined from OCR analysis). Further, searches may be made for types of events that occur during a communication session, including but not limited to audio events, visual events, when a particular user speaks, and/or when a particular user joined or left the communication session.

The media playing application 280 can analyse the metadata across all zoom levels for searched terms. For example, even though a full transcription of the recorded audio data stream is usually only displayed when the navigation area 612 is fully zoomed in, a match may nevertheless be found when the navigation area 612 is further zoomed out.

Search results may be displayed in an autocomplete manner e.g. where a list of closest matches is displayed and updated underneath the search box as the user enters each typed character. Each result may be indicated by a graphic 682, for example to indicate the type of event that has been found e.g. a change of slide event, an audio event, a visual event etc. Results found in keywords, keyphrases or part of the full transcription derived by the ASR 302 may be displayed with quotation marks (" ") to indicate that the result is part of the transcription. The results may also be provided with context i.e. if a searched word is found in the transcription, a short excerpt may be displayed for a result with the searched word shown in bold or highlighted in some way. Therefore the user can more easily understand the context of how the searched term has been used in the communication session. The results list may be sorted according to their assigned relevance level or in chronological order. In embodiments a time marker 684 may be shown next to a result indicating at which point in the recorded communication session the event occurs.

The user may select one of the suggested search results and in response the media playing application 280 causes the playback position (or paused position) of the recorded communication session to jump straight to the corresponding point in time of the playback. Further, by selecting a result, the navigation area 612 is updated to display the corresponding portion of text shown aligned with the time marker 604. In an alternative embodiment, selection of a search result does not alter or interrupt the current playback position but may update the navigation area 612 to show the corresponding portion of text in a prominent position e.g. at the top of the or in the middle of the navigation area 612.

If the selected result is associated with a portion of text that has an assigned relevance value such that it is already displayable in the zoom level at which the navigation 612 is currently at, then no change in the zoom level is effected by the media playing application 280. Alternatively, the selected result may be associated with a portion of text that has an assigned relevance value that is lower than that for portions of text that are being displayed at the current zoom level of the navigation area 612. In this case, the media playing application 280 controls the zoom level so that it is zoomed in to the zoom level associated with the lower relevance value so that the portion of text associated with the selected result is shown displayed in the navigation area 612 aligned with the time marker 604.

In embodiments the visual representations may be displayed in a first area of a user interface of the media playing application, wherein the first area is separate from a second area of the user interface which is configured for displaying the play back of the media file.

In embodiments the at least one communication stream may comprise an audio stream.

In embodiments, accessing the metadata may comprise: receiving, from a server, a transcription of the text converted from said at least one communication stream; or performing the conversion of said at least one communication stream at the user terminal; or a combination of both.

In embodiments, scrolling through the visual representations may comprise scrolling through the visual representations as displayed in the first area of the user interface such that each visual representation is displayed synchronously with the play back of the media file in the second area of the user interface.

In embodiments, the events may be determined based on an analysis of the at least one communication data stream of the recorded communication session, said one or more events comprising the occurrence of one or more of: a keyword or a keyphrase determined using natural language processing techniques; an event determined from an analysis of properties of a recorded audio stream or a recorded video stream; and/or an event determined from an analysis of screen sharing data, optionally comprising Optical Character Recognition techniques.

In embodiments, the rate of scrolling may include a default scrolling rate during which the play back of the audio component is maintained at a normal rate, wherein the normal rate is the rate at which the audio component was originally recorded in the communication session.

The method may comprise dynamically adjusting the rate of scrolling based on receiving, at the user terminal, a controlling action input by the user.

In embodiments, the step of dynamically adjusting the rate of scrolling may include automatically adjusting the rate of scrolling based on an inertia scrolling principle such that a rate of scrolling that is controlled by the user to be faster than the default scrolling rate gradually decays back to the default scrolling rate in response to the user ceasing the controlling action.

The method may comprise, when the rate of scrolling is faster than the default scrolling rate and above a predetermined threshold level, for one or more portions of the audio component for which a respective event is determined to have occurred, controlling the play back rate by reducing it to, or approximate to, the normal rate.

In embodiments, if the user continues to control the rate of scrolling to be faster than the default rate, the play back rate of the audio component may be kept synchronised with the faster scrolling rate.

In embodiments, if the user ceases controlling the rate of scrolling during play back of one of said portions which has been reduced to, or approximate to, the normal rate, the play back of the media file continues but at the normal rate, and the rate of scrolling returns to the default scrolling rate.

The method may comprise imposing a maximum limit on the faster scrolling rate.

The method may comprise, based on the controlling input of the user, the rate of scrolling is adjusted in either a forward or backward direction so that the synchronised play back of the media file is respectively advanced forwards or stepped back.

In embodiments, the media file may comprise a video component, and the media playing application is configured for playing back the video component in the second area of the user interface and synchronised with the rate of scrolling.

In embodiments, the play back rate of the audio component may be synchronised with the rate of scrolling by using one or more audio algorithms running on the user terminal.

In embodiments, the one or more audio algorithms comprises a "pitch synchronous and overlap add" digital signal processing algorithm.

The user terminal of the second aspect of the present disclosure may be configured in accordance with any of the above-described methods.

The media playing application of the third aspect of the present disclosure may be configured to perform any of the above-described methods.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals 102 and/or cloud meeting platform 105 may also include an entity (e.g. software) that causes hardware of those devices to perform operations, e.g., processors, functional blocks, and so on. For example, the user terminals 102 and/or cloud meeting platform 105 may include a computer-readable medium that may be configured to maintain instructions that cause those devices, and more particularly the operating system and associated hardware of those devices to perform operations. Thus, the instructions function to configure the operating system and associated hardware to perform the operations and in this way result in transformation of the operating system and associated hardware to perform functions. The instructions may be provided by the computer-readable medium to the user terminals 102 (or cloud meeting platform 105) through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
accessing a recording of a communication session as a media file that includes an audio component and metadata associated with the media file, the metadata including a visual representation of an event that occurred during the communication session and timing information matching the visual representation to the event, the visual representation based on text transcribed from a communication stream of the communication session;
presenting at a user terminal a media playing application configured to display the media file for playback and the visual representation for the event synchronized to the media file based on the timing information;
receiving a scrolling input at a portion of the media playing application displaying the visual representation; and
synchronizing a play back rate of the audio component with a rate of the scrolling input in an event that the rate of the scrolling input is faster than an unmodified play back rate of the audio component.

2. The method of claim 1 wherein the visual representation is one of a plurality of visual representations of events that occurred during the communication session, and wherein the portion of the media playing application displaying the visual representation comprises a first area of a user interface of the media playing application, wherein the first area is separate from a second area of the user interface which is configured for said displaying the media file for playback.

3. The method of claim 1 wherein the communication stream comprises an audio stream.

4. The method of claim 1, further comprising creating the visual representation of the event based on the text transcription including one or more of: receiving, from a server, the text transcription converted from the communication stream; and
performing the text transcription of the communication stream at the user terminal.

5. The method of claim 2, further comprising visually scrolling through the plurality of visual representations displayed in the first area of the user interface such that each visual representation is displayed in the first area of the user interface synchronously with the play back of the media file in the second area of the user interface.

6. The method of claim 1 wherein the event that occurred during the communication session is determined based on an analysis of the communication stream of the communication session, the event determined by one or more of:
a keyword or a keyphrase identified by natural language processing techniques;
an analysis of properties of a recorded audio stream or a recorded video stream; and
an analysis of screen sharing data, optionally including Optical Character Recognition techniques.

7. The method of claim 1, further comprising visually scrolling the portion of the media playing application displaying the visual representation, wherein a rate of visually scrolling includes a default scrolling rate during which the play back rate of the audio component is maintained at the unmodified play back rate at which the audio component was originally recorded in the communication session.

8. The method of claim 1 further comprising:
visually scrolling the portion of the media playing application displaying the visual representation synchronously with the play back of the media file; and
dynamically adjusting a rate of said visually scrolling based on receiving, at the user terminal, a controlling action input.

9. The method of claim 8 wherein said dynamically adjusting the rate of said visually scrolling includes automatically adjusting the rate of said visually scrolling based on an inertia scrolling principle such that the rate of said visually scrolling gradually decays back to a default visual scrolling rate synchronized to the unmodified play back rate of the audio component in response to ceasing said receiving the controlling action input.

10. The method of claim 9 wherein when the rate of said visually scrolling is faster than the default visual scrolling rate and above a predetermined threshold level, for one or more portions of the audio component for which a respective event is determined to have occurred, reducing the playback rate to, or approximate to, the unmodified play back rate of the audio component.

11. The method of claim 1 wherein if the rate of the scrolling input continues to be faster than the unmodified play back rate, the play back rate of the audio component is kept synchronised with the rate of the scrolling input.

12. The method of claim 10 wherein if the scrolling input ceases during play back of one of said portions which has been reduced to, or approximate to, the normal rate, the play back of the media file continues but at the normal rate, and the rate of said visually scrolling returns to the default visual scrolling rate.

13. The method of claim 1, further comprising imposing a maximum limit on the play back rate of the audio component.

14. The method of claim 8 further comprising, based on the controlling action input, adjusting said rate of visually scrolling in either a forward or backward direction so that the synchronised play back of the media file is respectively advanced forwards or stepped back.

15. The method of claim 1 wherein the media file further includes a video component, and the media playing application is configured for playing back the video component in a user interface, said playing back synchronised with the rate of scrolling input.

16. The method of claim 1 wherein the play back rate of the audio component is synchronised with the rate of the scrolling input by using one or more audio algorithms.

17. The method of claim 1 wherein the play back rate of the audio component is synchronised with the rate of the scrolling input by using a "pitch synchronous and overlap add" digital signal processing algorithm.

18. A user terminal for controlling playback of a recorded communication session, the user terminal comprising:
  a visual display unit configured to display a user interface of a media playing application;
  at least one processor; and
  one or more computer-readable storage media including instructions stored thereon that, responsive to execution by the at least one processor, cause the system to:
    access and store a recording of a communication session in the form of a media file that includes an audio component and metadata associated with the media file, the metadata including an indication of a respective one or more visual representations of each of a plurality of events determined to have occurred during the communication session, wherein at least some of the visual representations comprise text converted from a communication stream of the recorded communication session, and wherein the metadata includes timing information linking each of the one or more visual representations to a respective event; and
    present the media playing application configured to play back the media file at the visual display unit, the media playing application configured to control play back of the media file so that a play back rate of the audio component is synchronised with a rate of scrolling input received at a portion of the user interface of the media playing application displaying the one or more visual representations.

19. The user terminal of claim 18, wherein the media playing application is further configured to dynamically adjust a rate of visually scrolling the one or more visual representations based on receiving, at the user terminal, a controlling action input.

20. A memory device storing code configured so as when run on a user terminal to perform operations including:
  accessing a recording of a communication session in the form of a media file that includes an audio component;
  accessing metadata associated with the media file, wherein the metadata includes:
    one or more visual representations of each of a plurality of events determined to have occurred during the communication session, at least some of the visual representations including text converted from a communication stream of the recorded communication session, and
    timing information linking each of the one or more visual representations to a corresponding event;
  presenting a media playing application user interface configured to display the media file for playback and the one or more visual representations synchronized to the media file based on the timing information;
  receiving a scrolling input at a portion of the media playing application displaying the visual representations; and
  controlling play back of the media file so that a play back rate of the audio component and a visual scrolling rate of the visual representations is synchronised with a rate of the scrolling input.

* * * * *